United States Patent
Wu et al.

(10) Patent No.: US 12,452,733 B2
(45) Date of Patent: Oct. 21, 2025

(54) MULTI-BATCH REINFORCEMENT LEARNING VIA MULTI-IMITATION LEARNING

(71) Applicant: SAMSUNG ELECTRONICS CO., LTD., Suwon-si (KR)

(72) Inventors: Di Wu, Saint-Laurent (CA); Tianyu Li, Montreal (CA); David Meger, Montreal (CA); Michael Jenkin, Toronto (CA); Xue Liu, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 593 days.

(21) Appl. No.: 17/957,960

(22) Filed: Sep. 30, 2022

(65) Prior Publication Data

US 2023/0107539 A1   Apr. 6, 2023

Related U.S. Application Data

(60) Provisional application No. 63/253,823, filed on Oct. 8, 2021, provisional application No. 63/253,023, filed on Oct. 6, 2021.

(51) Int. Cl.
*H04W 28/086* (2023.01)
*G06N 3/08* (2023.01)
(Continued)

(52) U.S. Cl.
CPC ......... *H04W 28/0862* (2023.05); *H04L 41/16* (2013.01); *H04W 24/02* (2013.01);
(Continued)

(58) Field of Classification Search
CPC .. H04W 28/0862; H04W 24/02; H04L 41/16; G06N 3/08; G06N 20/00
See application file for complete search history.

(56) References Cited

U.S. PATENT DOCUMENTS

| 10,789,544 B2 | 9/2020 | Fiedel et al. |
| 2020/0136975 A1 | 4/2020 | Arora et al. |

(Continued)

FOREIGN PATENT DOCUMENTS

| CN | 105072638 A | 11/2015 |
| CN | 108848520 B | 4/2020 |

(Continued)

OTHER PUBLICATIONS

Wang et al., Deep Reinforcement Learning with Knowledge Transfer for Online Rides Order Dispatching, Dec. 30, 2018, IEEE Xplore (Year: 2018).*

(Continued)

*Primary Examiner* — Christopher M Crutchfield
*Assistant Examiner* — Aixa A Guadalupe Cruz
(74) *Attorney, Agent, or Firm* — Sughrue Mion, PLLC

(57) ABSTRACT

A server may receive a first traffic data and a second traffic data from a first base station and a second base station; obtain a first augmented traffic data for the first base station, based on the first traffic data and a subset data of the second traffic data; obtain a second augmented traffic data for the second base station, based on the second traffic data and a subset data of the first traffic data; obtain a first artificial intelligence (AI) model via imitation learning based on the first augmented traffic data; obtain a second AI model imitation learning based on the second augmented traffic data; obtain a generalized AI model via knowledge distillation from the first AI model and the second AI model; and predict a future traffic load of each of the first base station and the second base station based on the generalized AI model.

20 Claims, 12 Drawing Sheets

(51) Int. Cl.
  H04L 41/16 (2022.01)
  H04W 24/02 (2009.01)
  H04W 24/10 (2009.01)
  G06N 20/00 (2019.01)

(52) U.S. Cl.
  CPC .............. *G06N 3/08* (2013.01); *G06N 20/00* (2019.01); *H04W 24/10* (2013.01)

(56) References Cited

U.S. PATENT DOCUMENTS

| | | |
|---|---|---|
| 2021/0266247 A1 | 8/2021 | Sivaraj et al. |
| 2021/0289586 A1 | 9/2021 | Kerpez |
| 2021/0398014 A1 | 12/2021 | Cao et al. |
| 2022/0116799 A1 | 4/2022 | Wang et al. |
| 2023/0135872 A1* | 5/2023 | Singh ................ H04W 52/0206 370/318 |

FOREIGN PATENT DOCUMENTS

| | | |
|---|---|---|
| CN | 112884075 A | 6/2021 |
| CN | 113365312 A | 9/2021 |
| KR | 10-2021-0117960 A | 9/2021 |
| WO | 2021/139881 A1 | 7/2021 |

OTHER PUBLICATIONS

Communication dated Sep. 24, 2024, issued by the European Patent Office in counterpart European Application No. 22878927.7.
Duc-Huy Le et al., "An AI-based Traffic Matrix Prediction Solution for Software-Defined Network," IEEE International Conference on Communications, 2021, total 6 pages, XP033953307.
Communication dated Jan. 9, 2023, issued by the International Searching Authority in counterpart International Application No. PCT/KR2022/015057 (PCT/ISA/220, 210, 237).
Communication dated Aug. 18, 2025, issued by the European Patent Office in counterpart European Application No. 22878927.7.

* cited by examiner

MULTI-BATCH REINFORCEMENT LEARNING VIA MULTI-IMITATION LEARNING

CROSS-REFERENCE TO RELATED APPLICATION(S)

This application is based on and claims priority under 35 U.S.C. § 119 to U.S. Provisional Application No. 63/253,823, filed on Oct. 8, 2021, and U.S. Provisional Application No. 63/253,023, filed on Oct. 6, 2021, the disclosures of which are incorporated herein by reference in their entireties.

BACKGROUND

1. Field

The disclosure relates generally to systems and methods for reinforcement learning (RL).

2. Description of Related Art

Reinforcement learning (RL), particularly deep RL, can achieve adequate performance on different control tasks. RL aims to learn an optimal control policy through interactions with the environment. Deep RL combines neural networks with RL and further enables the RL agents to deal with more complex environments. However, deploying RL algorithms for real-world problems can be very challenging. Most online RL algorithms require a large number of interactions with the environment to learn a reliable control policy. This assumption of the availability of repeated interactions with the environment does not hold for many real-world applications due to safety concerns, costs/inconveniences related to interactions, or the lack of an accurate simulator to enable effective training in simulation prior to deployment and training in the real world. Thus, practical application of reinforcement learning algorithms in the real world is limited by its poor data efficiency and its inflexibility of learning in an offline fashion.

Batch RL aims to learn a good control policy from a previously collected data set. Many batch RL algorithms are designed for a single batch setting and assume that a large number of interaction samples in fixed data sets are available. For example, when performing load balancing for nodes in a wireless network, there may be only a very limited amount of collected data for newly established nodes in the network. It is difficult for most current batch RL algorithms to learn a reliable policy with a limited amount of data points. These assumptions limit the use of batch RL algorithms in real world applications.

SUMMARY

Example embodiments address at least the above problems and/or disadvantages and other disadvantages not described above. Also, the example embodiments are not required to overcome the disadvantages described above, and may not overcome any of the problems described above.

According to an aspect of the disclosure, a method for performing traffic load balancing in a communication system is provided. The method may include: receiving a first traffic data from a first base station; receiving a second traffic data from a second base station; obtaining a first augmented traffic data for the first base station, based on the first traffic data and a subset data of the second traffic data; obtaining a second augmented traffic data for the second base station, based on the second traffic data and a subset data of the first traffic data; obtaining a first artificial intelligence (AI) model via imitation learning based on the first augmented traffic data; obtaining a second AI model via imitation learning based on the second augmented traffic data; obtaining a generalized AI model via knowledge distillation from the first AI model and the second AI model; and predicting a future traffic load of each of the first base station and the second base station based on the generalized AI model.

The obtaining of the first augmented traffic data may include: obtaining an upper envelope function based on the first traffic data; obtaining a sample selection ratio for a state-action pair of the second traffic data based on the upper envelope function; and based on the sample selection ratio for a state-action pair of the second traffic data being greater than a predetermined sample selection ratio threshold, appending the state-action pair of the second traffic data to the first augmented traffic data.

The sample selection ratio may represent a similarity between state-action pairs of the first traffic data and the state-action pair of the second traffic data.

The state-action pair may include a state of the communication system, and a reward to be received as a result of taking an action at the state, and wherein the state may include at least one of an active user equipment (UE) number, an internet protocol (IP) throughput, a cell physical resource usage, and a speed of a download link, the action may include a load balancing parameter that causes the state to be changed, and the reward may include a minimum of IP throughput.

The obtaining the sample selection ratio may include: obtaining an estimated return of the state-action pair of the second traffic data; and obtaining the sample selection ratio by dividing the estimated return of the state-action pair of the second traffic data by the upper envelope function.

The obtaining the generalized AI model may include: computing a distillation loss between actions output from the first AI model and the second AI model and actions output from the generalized AI model, and training generalized AI model based on the distillation loss.

The obtaining the generalized AI model may include: computing a triplet loss based on a difference between identical tasks and a difference between different tasks, wherein the identical tasks are to predict a future traffic load for a same base station, and the different tasks are to predict future traffic loads for different base stations, and an identity of each of the identical tasks and the different tasks is provided by a task interference AI model; combining the distillation loss and the triplet loss as an overall loss of the generalized AI model; and training the generalized AI model until the overall loss converges or reaches a preset threshold value.

The method may further include: transmitting the generalized AI model to the first base station to update the generalized AI model as a first updated AI model based on a system observation of the first base station; and transmitting the generalized AI model to the second base station to update the generalized AI model as a second updated AI model based on a system observation of the second base station.

Each of the first traffic data and the second traffic data may include information of at least one of a number of active user equipment (UEs) per cell, a cell load ratio, and an internet protocol (IP) throughput per cell.

According to another aspect of the disclosure, a server for performing traffic load balancing in a communication system is provided. The server may include: a memory storing instructions, and at least one processor configured to execute the instructions to: receive a first traffic data from a first base station; receive a second traffic data from a second base station; obtain a first augmented traffic data for the first base station, based on the first traffic data and a subset data of the second traffic data; obtain a second augmented traffic data for the second base station, based on the second traffic data and a subset data of the first traffic data; obtain a first artificial intelligence (AI) model via imitation learning based on the first augmented traffic data; obtain a second AI model imitation learning based on the second augmented traffic data; obtain a generalized AI model via knowledge distillation from the first AI model and the second AI model; and predict a future traffic load of each of the first base station and the second base station based on the generalized AI model.

The at least one processor may be further configured to execute the instructions to: obtain an upper envelope function based on the first traffic data; obtain a sample selection ratio for a state-action pair of the second traffic data based on the upper envelope function; and based on the sample selection ratio being greater than a predetermined sample selection ratio threshold, append the state-action pair of the second traffic data to the first augmented traffic data.

The sample selection ratio may represent a similarity between state-action pairs of the first traffic data and the state-action pair of the second traffic data.

The state-action pair may include a state of the communication system, and a reward to be received as a result of taking an action at the state. The state may include at least one of an active user equipment (UE) number, an internet protocol (IP) throughput, and a cell physical resource usage, and a speed of a download link, the action may include a load balancing parameter that causes the state to be changed, and the reward may include a minimum of IP throughput.

The at least one processor may be further configured to execute the instructions to: obtain an estimated return of the state-action pair of the second traffic data; and obtain the sample selection ratio by dividing the estimated return of the state-action pair of the second traffic data by the upper envelope function.

The at least one processor may be further configured to execute the instructions to: compute a distillation loss between actions output from the first AI model and the second AI model and actions output from the generalized AI model, and train generalized AI model based on the distillation loss.

The at least one processor may be further configured to execute the instructions to: compute a triplet loss based on a difference between identical tasks and a difference between different tasks, wherein the identical tasks are to predict a future traffic load for a same base station, and the different tasks are to predict future traffic loads for different base stations, and an identity of each of the identical tasks and the different tasks is provided by a task interference AI model; combine the distillation loss and the triplet loss as an overall loss of the generalized AI model; and train the generalized AI model until the overall loss converges or reaches a preset threshold value.

The at least one processor is further configured to execute the instructions to: transmit the generalized AI model to the first base station to update the generalized AI model as a first updated AI model based on a system observation of the first base station; and transmit the generalized AI model to the second base station to update the generalized AI model as a second updated AI model based on a system observation of the second base station.

Each of the first traffic data and the second traffic data may include information of at least one of a number of active user equipment (UEs) per cell, a cell load ratio, and an internet protocol (IP) throughput per cell.

According to another aspect of the disclosure, there is provided a non-transitory computer-readable storage medium storing instructions that, when executed, cause at least one processor to: receive a first traffic data from a first base station; receive a second traffic data from a second base station; obtain a first augmented traffic data for the first base station, based on the first traffic data and a subset data of the second traffic data; obtain a second augmented traffic data for the second base station, based on the second traffic data and a subset data of the first traffic data; obtain a first artificial intelligence (AI) model via imitation learning based on the first augmented traffic data; obtain a second AI model imitation learning based on the second augmented traffic data; obtain a generalized AI model via knowledge distillation from the first AI model and the second AI model; and predict a future traffic load of each of the first base station and the second base station based on the generalized AI model.

The instructions may cause the at least one processor to: obtain a sample selection ratio for a state-action pair of the second traffic data based on a similarity between state-action pairs of the first traffic data and the state-action pair of the second traffic data; and based on the sample selection ratio being greater than a predetermined sample selection ratio threshold, append the state-action pair of the second traffic data to the first augmented traffic data.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
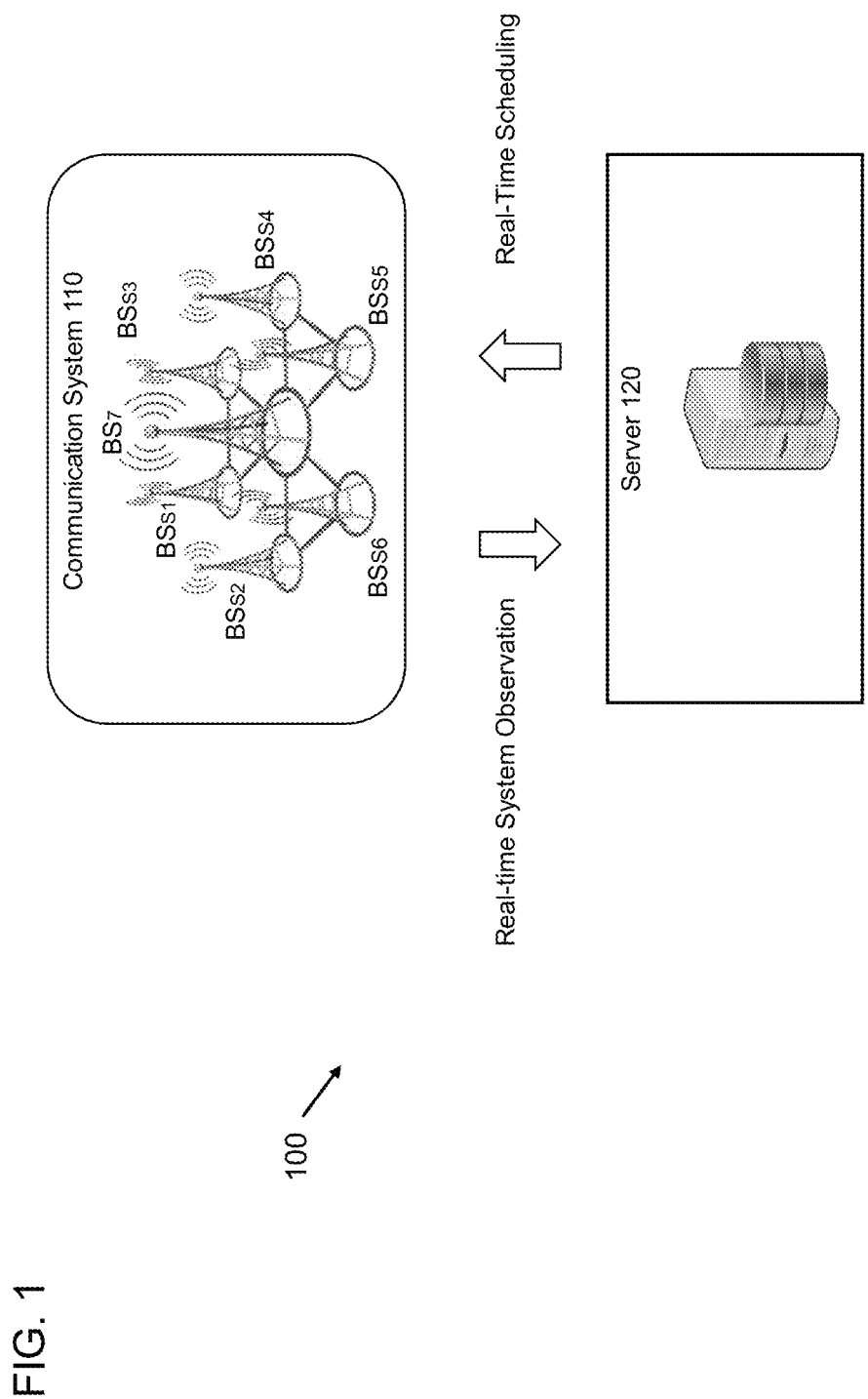
FIG. 1 is a diagram showing a general overview of a system for performing multi-batch reinforcement learning for traffic load balancing in a communication system according to embodiments of the present disclosure.

The following detailed description of example embodiments refers to the accompanying drawings. The same reference numbers in different drawings may identify the same or similar elements.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 2:
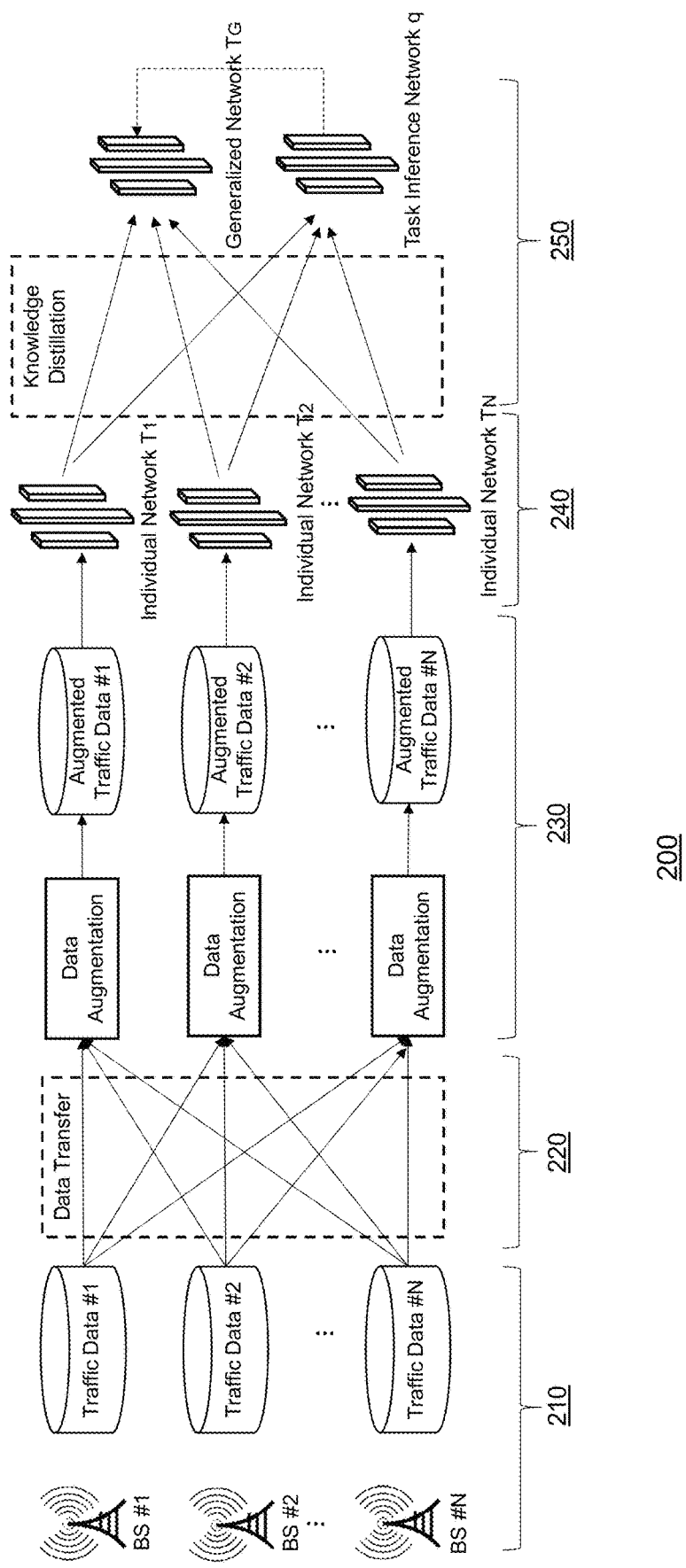
FIG. 2 illustrates a method for performing multi-batch reinforcement learning for traffic load balancing in a communication system according to embodiments of the present disclosure.

FIG. 1 is a diagram showing a general overview of a system 100 for performing multi-batch reinforcement learning for traffic load balancing in a communication system according to embodiments. FIG. 2 illustrates a method 200 of performing multi-batch reinforcement learning for traffic load balancing according to embodiments. The system 100 and the method 200 can be used to balance electric loads, transportation traffic loads, and the like, as well as to balance communication system traffic loads.

The system 100 may include a communication system 110 and a server 120.

The communication system 110 may include a plurality of base stations $BS_{S1}$-$BS_{S7}$, which communicate with the server 120. The plurality of base stations $BS_{S1}$-$BS_{S7}$ may transmit real-time system observation results to the server 120, and the server 120 may perform multi-batch reinforcement learning to balance traffic loads among a plurality of cells managed by each of the plurality of base stations $BS_{S1}$-$BS_{S7}$, based on the real-time system observation results.

The server 120 may receive the real-time system observation data from the communication system 110. The real-time system observation data may include information of a communication system state, such as a number of active user equipment (UEs) in each cell, a cell load ratio, an internet protocol (IP) throughout per cell, and a cell physical resource block (PRB) usage ratio.

The server 120 may be implemented as a single server configured to receive traffic data from the plurality of base stations $BS_{S1}$-$BS_{S7}$, and provide real-time scheduling instructions to each of the plurality of base stations $BS_{S1}$-$BS_{S7}$ so that the plurality of base stations $BS_{S1}$-$BS_{S7}$ may evenly distribute traffic loads to the plurality of cells of the plurality of base stations $BS_{S1}$-$BS_{S7}$. Alternatively, the server 120 may be implemented as a plurality of servers, wherein each of the plurality of servers may send a real-time scheduling instruction to a corresponding one of the plurality of base stations $BS_{S1}$-$BS_{S7}$.

The real-time scheduling may be applied to another load generating system, such as an electric utility system or a transportation system. However, for the sake of explanation, the following description will discuss an embodiment that performs multi-batch reinforcement learning for traffic load balancing in a communication system.

Provided are systems, methods and devices for obtain a generalized policy network for predicting future traffic loads of a plurality of base stations via imitation learning-based knowledge distillation. The systems, methods and devices may implement transfer learning to overcome the challenges of reinforcement learning (RL) and batch RL. Transfer learning uses the knowledge from source domains (i.e., a domain including a large amount of data) to improve the learning performance in a target domain (i.e., a domain of interest, but with a limited amount of available data). Sample transferring may be implemented to transfer related data points from source control tasks to improve the learning performance in the target control task. In real world scenarios, it is more common to have batches collected from a set of tasks that have similar Markov Decision process (MDP) settings, rather than identical tasks/single batch settings. Thus, the systems, methods and devices disclosed herein learn a general policy that performs well on these different tasks even including tasks not previously seen without further adaption. To improve the task-level generalization of the policy learned with batch RL, some embodiments utilize multi-batch settings, referred to as multi-batch BAIL (MBAIL). Compared with other batch RL algorithms, the systems, methods, and devices disclosed herein may be utilized to manage more general real-world scenarios.

FIG. 2 illustrates a method 200 of performing multi-batch reinforcement learning for traffic load balancing in a communication system according to embodiments.

The communication system may formulate a 5th generation (5G)/sixth generation (6G) (e.g., load balancing) problem as a Markov Decision Process (MDP). The communication system may collect historical traffic datasets from base stations and may perform sample transferring to improve the performance of a batch reinforcement learning policy that is learned on a single dataset. The communication system may generate augmented traffic datasets based on the sample transferring between the historical traffic datasets. The communication system may generate multiple individual policy networks based on the augmented traffic datasets. The communication system may perform policy distillation to generate a generalized policy network via knowledge distillation from the multiple individual policy networks. The generalized policy network may generalize to multiple base stations and is learned from the historical traffic datasets of the base stations directly.

Specifically, the method 200 may include operation 210 of collecting a plurality of traffic datasets (e.g., Traffic Data #1-Traffic Data #N) from a plurality of base stations (e.g., BS #1-BS #N), respectively, operation 220 of transferring a target traffic dataset (e.g., Traffic Data #1) and source traffic datasets (e.g., Traffic Data #2-Traffic Data #N) to a target batch, operation 230 of obtaining augmented traffic datasets (e.g., Augmented Traffic Data #1) by appending the target traffic dataset (e.g., Traffic Data #1) and a part of the source traffic datasets (e.g., Traffic Data #2-Traffic Data #N) to the target batch, operation 240 of obtaining individual policy networks $T_N$ based on augmented traffic datasets (e.g., Augmented Traffic Data #1-Augmented Traffic Data #N), respectively, and operation 250 of obtaining a generalized policy network $T_G$ via knowledge distillation from the individual policy networks $T_N$. The term "batch" may refer to a set of data that is used to train a particular neural network, or a database storing the set of data.

In operation 210, the plurality of base stations (e.g., BS #1-BS #N) may collect its own local traffic data to obtain the plurality of traffic datasets (e.g., Traffic Data #1-Traffic Data #N), respectively. Each of the plurality of traffic datasets may include M data points $\beta=\{(s_t,a_t,r_t,s'_t)|t=1,\ldots,M\}$ to leverage Markov Decision Process (MDP)-based reinforcement learning (RL), wherein s denotes a current state, a denotes an action, r denotes a reward, and s' denotes an expected state when the action is taken in the current state. According to embodiments of the disclosure, the method 200 may leverage reinforcement learning (RL) in which a learning agent aims to learn an optimal control policy by interacting with the communication system 111. An RL problem may be formulated as a Markov Decision Process (MDP), such as a tuple (S, A, ρ, r, μ, γ) where S is the state space, A is the action space, $\rho \otimes A \rightarrow S$ is the state transition function, $r \otimes A \rightarrow R$ is the reward function, μ is the initial state distribution and γ is the discount factor. The solution to an RL problem (i.e., a control policy) is a function: $\pi:S \rightarrow A$. In batch RL, the method 200 is performed to learn a high performance control policy using an offline data set (e.g., M data points β obtained from historical traffic data of the plurality of base stations) without further interactions with the communication system 111. In embodiments of the disclosure, the term "state" may refer to a state of a base station or a cell, and for example, may include or indicate the number of active user equipment (UEs), IP throughput per cell, a cell physical resource usage, a speed of a download link, and the like. The term "action" may refer to a control action taken by the communication system or the base station to perform traffic load balance between multiple base stations or between multiple cells covered by a single base station. For example, a control action of adjusting threshold values for load balancing features may be set as the "action." The term "reward" may refer to a value added to the current state in response to the "action" being taken at the current state. For example, a minimum IP throughput per cell may be set as the "reward" in embodiments of the present disclosure.

In operation 220, each of the plurality of traffic datasets (e.g., Traffic Data #1-Traffic Data #N) is transferred to each of the batches to perform data augmentation. For example, when a first traffic dataset (e.g., Traffic Data #1), a second traffic dataset (e.g., Traffic Data #2), and a third traffic dataset (e.g., Traffic Data #3) are respectively collected from a first base station (e.g., BS #1), a second base station (e.g., BS #2), and a third base station (e.g., BS #3), the first traffic dataset, the second traffic dataset, and the third traffic dataset are transferred to each of a first batch, a second batch, and a third batch. Here, the first batch, the second batch, and the third batch are provided to contain data for training a first individual policy network, a second individual policy network, and a third individual policy network to predict a future traffic load of the first base station, the second base station, and the third base station, respectively.

In operation 230, data augmentation is performed based on comparison between a target batch and source batches. When data augmentation is performed, the current batch is treated as the target batch, and remaining batches are considered as the source batches. For example, when data augmentation is performed to obtain a training data (e.g., Augmented Traffic Data #1) for a first individual policy network (e.g., Individual Network T1) that is configured to predict a future traffic load of the first base station (e.g., BS #1), the first traffic dataset (e.g., Traffic Data #1) collected from the first base station is treated as the target batch, and the remaining traffic datasets (e.g., Traffic Data #2-Traffic Data #3) collected from other neighboring base stations (E.g., BS #2-BS #N) are treated as source batches.

In performing data augmentation according to operation 230, a plurality of state-action pairs are obtained from the source batches, and a similarity score of each of the plurality of state-action pairs in comparison with state-action pairs of the target batch is computed. The similarity score may be referred to as a sample selection ratio which will be described later. Among the plurality of state-action pairs obtained from the source batches, state-action pairs having a similarity score that is greater than a threshold value, may be appended to the target batch to form an augmented traffic dataset. Operation 230 will be described in further detail with reference to FIG. 3.

In operation 240, each of a plurality of individual policy networks (e.g., Individual Networks $T_1$-$T_N$) are trained using a plurality of augmented traffic data sets (e.g., Augmented Traffic Data #1) via imitation learning. The imitation learning allows the individual policy networks to mimic an expert's behavior (e.g., actions in the expert's trajectories that are assumed to be independently and identically distributed) in a given task. For example, the system collects a data set consisting of state-action pairs, which show an action chosen by the expert in a specific state, and performs imitation learning to learn an individual policy network that mimic the expert's actions taken in specific states. Here, the expert may refer to a reference neural network or a reference data which provide an expert's behavior. The expert's behavior may be treated as a label or a ground-truth value in calculating a loss of the individual policy network. Operation 240 is described in further detail with reference to FIG. 4.

In operation 250, the generalized policy network $T_G$ may be obtained via knowledge distillation from the plurality of individual policy networks $T_1$-$T_N$ by minimizing or converging a distillation loss. A network loss may be determined to be minimized or converged when the network loss has reached its minimum point, the network loss has reached a preset minimum value (e.g., a range from 0 to 0.1), or the network loss does not reduce any longer via an iterative training process and therefore has reached a constant value. As the distillation loss, any one or any combination of a KL divergence loss, a negative log likelihood loss, and a mean squared error loss is computed. Also, in addition to the distillation loss, a triplet loss may be computed using a task inference network q and a sum of the distillation loss and the triplet loss may be obtained as an overall loss, and the generalized policy network $T_G$ is trained to minimize or converge the overall loss. The task inference network q takes a state, an action, and a reward as inputs, and output a task identity. The task inference network q may identify same tasks and different tasks based on similarities between state-action-reward tuples of multiple different tasks or similarities between trajectories of state-action pairs of the multiple different tasks. The generalized policy network $T_G$ is adopted for predicting a future traffic load of each of the plurality of base stations. Operation 250 is described in further detail with reference to FIG. 5.

Figure 3:
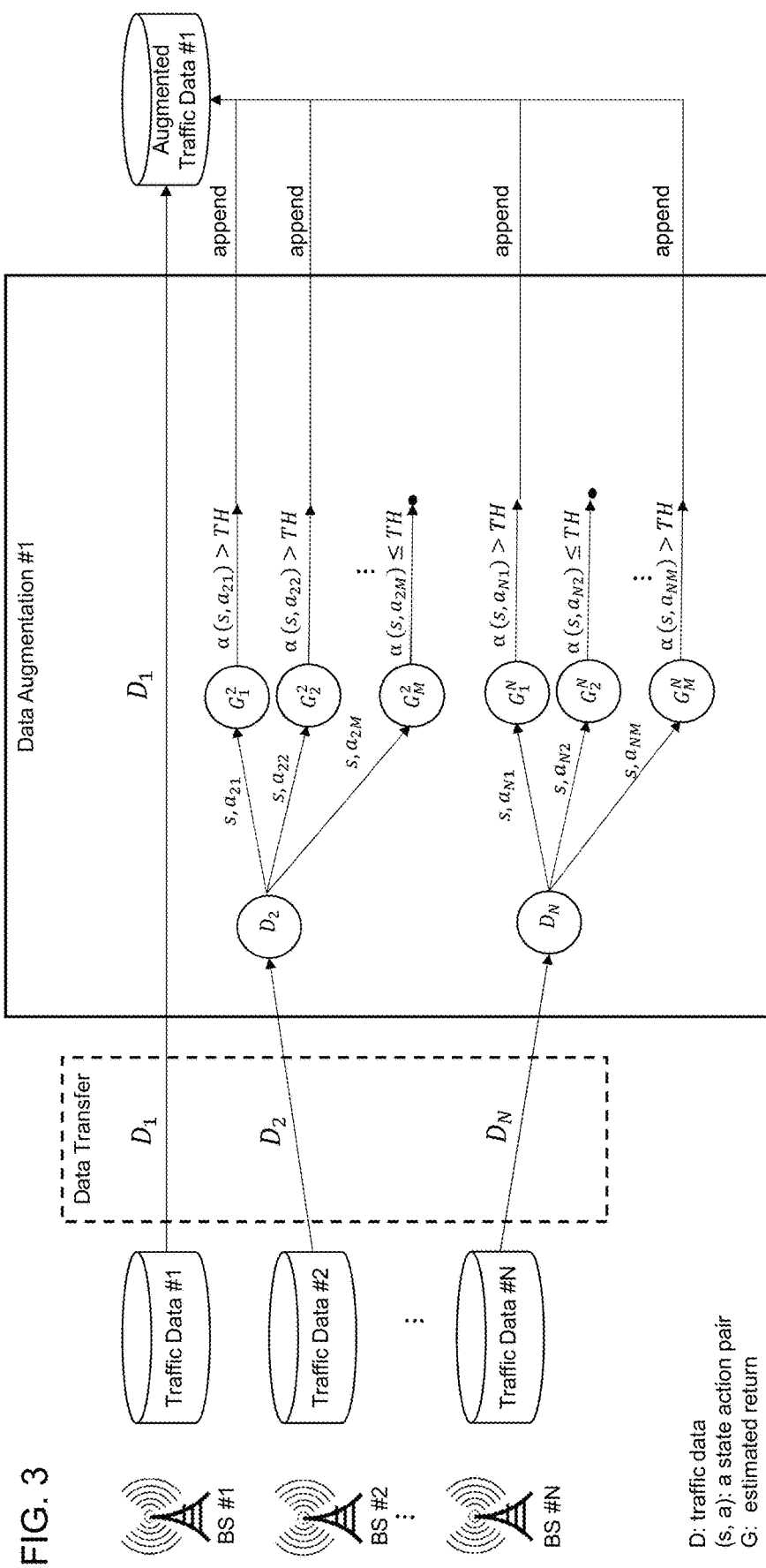
FIG. 3 illustrates a method for performing data augmentation according to embodiments of the present disclosure.

FIG. 3 illustrates a method 230 for performing data augmentation according to embodiments. FIG. 3 illustrates only a first augmentation process in which a first traffic dataset collected from a first base station BS #1, is selected as a target batch, and other traffic datasets collected from as the remaining base stations BS #2-BS #N are treated as source batches. However, the embodiment is not limited thereto, and the entire augmentation process may include switching the target base station to another traffic dataset (e.g., a second traffic dataset collected from a second base station BS #2) until augmentation is performed on each of the traffic datasets collected from the base stations BS #1-BS #N.

Referring to FIG. 3, when a target batch is $D_1$, for each source batch $D_2$-$D_N$, the server may determine an estimated return G of source batch samples, respectively, based on state-action pairs (s,a). The server may compute a sample selection ratio α for each of the state-action pairs (s,a), based on an upper envelope function V which takes a state as input and outputs a supremum of an estimated return (i.e., an estimated accumulated rewards) as an upper envelope. The server may compute a ratio of the estimated return G to the upper envelope, as a sample selection ratio. The sample selection ratio may represent a degree of similarities between state-action pairs of each of the source batches, and state-action pairs of the target batch. Then, based on the sample selection ratio α being greater than a predetermined sample selection ratio threshold TH, the state-action pairs of the source batches $D_2$-$D_N$ are appended to the target batch $D_1$.

The method 230 may perform an imitation learning-based batch RL algorithm to identify actions that can achieve high return for each state s and then learns a control policy based on these selection state-action pairs. In order to obtain a control policy that achieves high return, the agent needs to achieve the maximum expected cumulative rewards (i.e., a state value function). Given a state $s \in S$ and a policy π, the state value function under policy π is defined by $V^\pi(s)=E^\pi(R_1+\gamma R_2+\ldots \gamma^{n-1}R_n)$ where $R_i$ denotes the reward obtained at time step i. For example, for a particular state-action pair (s,a), G(s,a) may denote the return starting in state s and action a, under policy π. The optimal state value function may be denoted by $V^*(s)$. Then, if the action a* satisfies $G(s, a^*)=V^*(s)$, a* is an optimal action for state s. The problem now becomes how to obtain the optimal state value function V* in a batch setting. Since there are no further interactions with the environment, the server may eliminate as many useless state-action pairs in the batch as possible, to avoid the algorithm inferring bad actions. To do this, the server estimates a supremum of the optimal state value function V*, which is referred to as an upper envelope.

An upper envelope function V may be learned by fitting a model that takes the state (s) as input and the accumulated reward ($G_i$) is used as the output. The upper envelope function may be treated as the approximate state value for a state and it may be used to determine the sample selection ratio for the state-action pair. Given φ=(w,b), a parameterized neural network, $V_\varphi: S \to R$, a regularization weight λ and a data set D of size m, where $D_i=(s_i, G_i)$ and $G_i$ is the accumulated return of the state $s_i$ computed within the given batch, then the upper envelope function $V: S \to R$ is estimated by minimizing the loss function as in Equation (1):

$$\min_\phi \sum_{k=1}^{m} [V_\phi(s_i) - G_i]^2 + \lambda \|\omega\|^2; \text{s.t.} V_\phi(s_i) > G_i \qquad (1)$$

Where i=1, 2, . . . , m. Once the upper envelope function V is estimated, the best state-action pairs can be selected from the batch data set β based on the estimated V. One way of selecting such a pair is that for a fixed β>0, the system may choose all ($s_i$, $a_i$) pairs from the batch data set β such that, as in Equation (2).

$$G_i > \beta V(s_i) \qquad (2)$$

β may be set such that p % of the data points are selected, where p is a hyper-parameter. For example, β may be set to make 25% of all the data points selected for each batch, and β may be used as a sample selection threshold.

In real world applications, there may only be a limited amount of data for the task of interest, referred to as the target task. There may also be a set of tasks that have a large amount of training samples, referred to as source tasks. For example, it may be desired to learn an energy management control policy for a newly built buildings with only a limited number of previously collected samples. There may be a large amount of data collected from other buildings. Transfer learning is effective on using knowledge from the source domains to improve the model performance in the target domain. The system utilizes sample transfer from the source tasks (i.e., source batches) to improve the model performance learned for the target task.

Sample transfer utilizes samples from numerous source tasks to construct a comprehensive data set to improve the learning on the target task. According to embodiments of the disclosure, given a target task T, a state action pair (s,a) from any source task and its trajectory $\eta_{s,a}=((s,a), (s_1,a_1), \ldots, (s_k,ak))$, the sample selection ratio $\alpha$ of the state action pair (s,a) may be calculated by dividing a sum of future rewards (G) which can be calculated directly from the dataset by the learned upper envelope function V, as in Equation (3).

$$\alpha(s, a) = \frac{\hat{G}^t(\eta_{s,a})}{V^t(s)} \quad (3)$$

$\hat{G}^t(\eta)$ is the estimated return of the source task samples evaluated on the target task and the same is for $V^t(s)$. Then, given a selection threshold TH, if any state action pair (s,a) has $\alpha(s,a)>$TH, the system may incorporate this pair into the newly selected batch. By assuming the correct estimation of $G^t$ and $V^t$, the system may follow the best-action imitation learning routine where the state action pair induces the best action.

Then, the system may obtain an estimate of the return $\hat{G}^t$ evaluated on the target task. To solve this, the system may first learn a reward function on the target task $\hat{r}_t:S \times A \rightarrow R$. Then, given a discount factor $\gamma$ and a trajectory of state action pairs $\eta=(s_1,a_1), (s_2,a_2), \ldots, (s_M,a_M)$ for any source task batch, the system may obtain the return estimate on the target task, as in Equation (4).

$$\hat{G}^t(\eta) = \sum_{i=1}^{M} \gamma^{i-1} \hat{r}_t(s_i, a_i) \quad (4)$$

It may be assumed all tasks share the same transition function, and the batch is collected via the same policy, therefore Equation (4) is a reasonable estimation of the return on the target task. Once the return estimation is complete, the system may select the samples based on the selection ratio function $\alpha$ and some threshold TH. The selection threshold TH is a parameter that may be tuned depending on how much data is to be transferred. The value of the selection threshold TH may be tuned by checking the size of transferred data from the source to the target. The selection threshold TH may be increased to transfer more samples from the source to the target, or may be reduced to transfer less samples from the source to the target.

The sample transfer may be determined based on the spatial relationship to guide the sample transfer. For example, the system may transfer all the samples collected from the nearest base stations. The system may utilize the semantic relationship to guide the sample transfer. For example, the system may transfer all the samples collected from the base station serving the same type of customers. The system may learn a specific neural network (e.g., a feedforward neural network, a long-short term memory neural network, etc.) to guide the sample selection. The inputs may be the system states and the output may be a sample selection guidance value. If the output is larger than 0.5 or some other predetermined value, the system may select the sample.

The system may select the selection threshold TH such that the top p % of all data from the source tasks are chosen. Once the data is selected, the system may use a standard supervised learning-based imitation learning method to obtain the final best-action imitation learning and policy. An example embodiment of an algorithm for learning a control policy is shown in Algorithm 1 below.

[Algorithm 1]
Algorithm 1 BAIL+: Best Action Imitation Learning
with Multi-source Sample Transfer Input: A target task batch $B_t$ and N source task batches $B_1, B_2, \ldots, B_N$
and the pre-defined sample selection ratio threshold $\bar{\alpha}$
1: Learn the upper envelope function $V_t$ and the reward
   function $f_t$ for batch $B_t$.
2: for j = 1, ..., N do
3:    for d = 1, ..., M do
4:       Denote the current state action pair by $(s_d^j, a_d^j)$.
5:       estimate return of sample $(s_d^j, a_d^j)$, denote by $G_d^j$.
6:       Compute the sample selection ratio $\alpha(s_d^j, a_d^j)$
7:       if $\alpha(s_d^j, a_d^j) > \bar{\alpha}$ then
8:          Append $(s_d^j, a_d^j)$ to dataset $B_t$
9:       end if
10:   end for
11:   Learn the final policy $\pi_t$ on $B_t$ via imitation learning
12: end for
Output: the final policy of the target task $\pi_t$ FIG. 4 illustrates a method 240 for obtaining individual policy networks according to embodiments.

In operation 241, the system may receive inputs, such as an augmented dataset of state, action, and reward tuples (e.g., ($s_i$, a, $s_{i+1}$, r)), and may feed the dataset to the individual policy network. In operation 242, the system may train the individual policy network via imitation learning by minimizing a loss function, to use the trained individual policy network as a teacher network of the generalized policy network.

The imitation learning allows the individual policy networks to mimic an expert's behavior (e.g., actions in the expert's trajectories that are assumed to be independently and identically distributed) in a given task. For example, the system collects a data set consisting of state-action pairs which shows for a specific state, what action would be chosen by the expert, and performs imitation learning to learn an individual policy network which decides an action to be taken in a current state. Here, the expert may refer to a reference neural network or a reference data which provide an expert's behavior. The expert's behavior may be treated as a label or a ground-truth value in calculating the loss function of the individual policy network.

Figure 4:
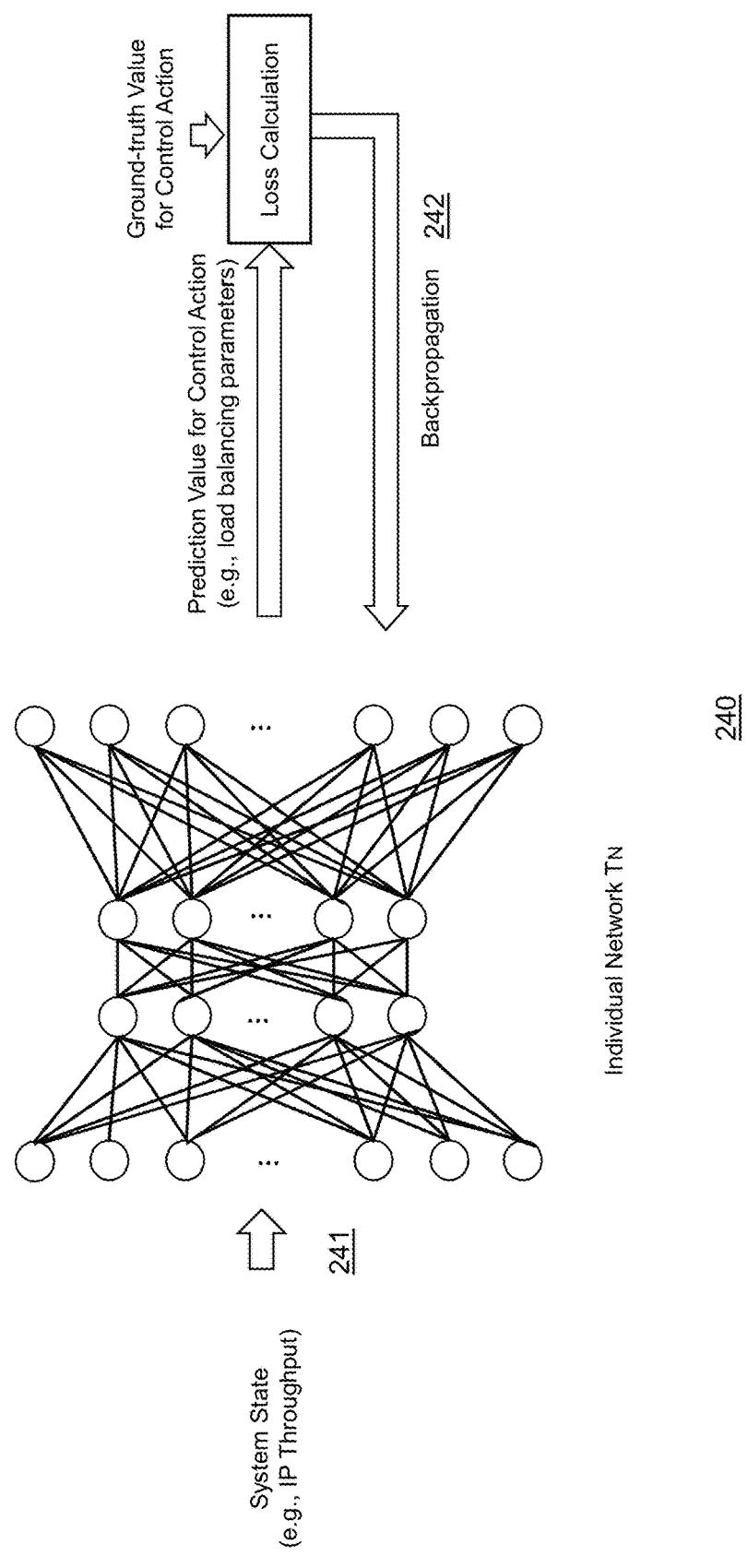
FIG. 4 illustrates a method for obtaining individual policy networks according to embodiments of the present disclosure.

As shown in FIG. 4, the system states (e.g., IP throughput) may be used as an input to the individual policy network (or other regression models), and the control actions (e.g., load balancing control actions) may be output from the individual policy network.

The system may perform classic supervised learning (e.g., neural networks or other supervised learning models) with a squared loss (as well as other loss functions, such as L1 loss, absolute distance). The process may be stopped after a predetermined number of training steps are reached. The machine learning model utilized may be a neural network, but is not necessarily limited as such.

In one example embodiment, the model may include a feedforward neural network with a structure of a first layer having 48 nodes, a second layer having 32 nodes, and third layer having 32 nodes and a fourth layer having 24 notes (e.g., [48, 32, 32, 24]). The loss function may be determined as in Equation (5):

$$\sum_{i=1}^{24}(y_i - \hat{y}_i) \quad (5)$$

where $y_i$ is the ground truth for control actions, and $\hat{y}_i$ is the prediction value for the control actions.

Figure 5:
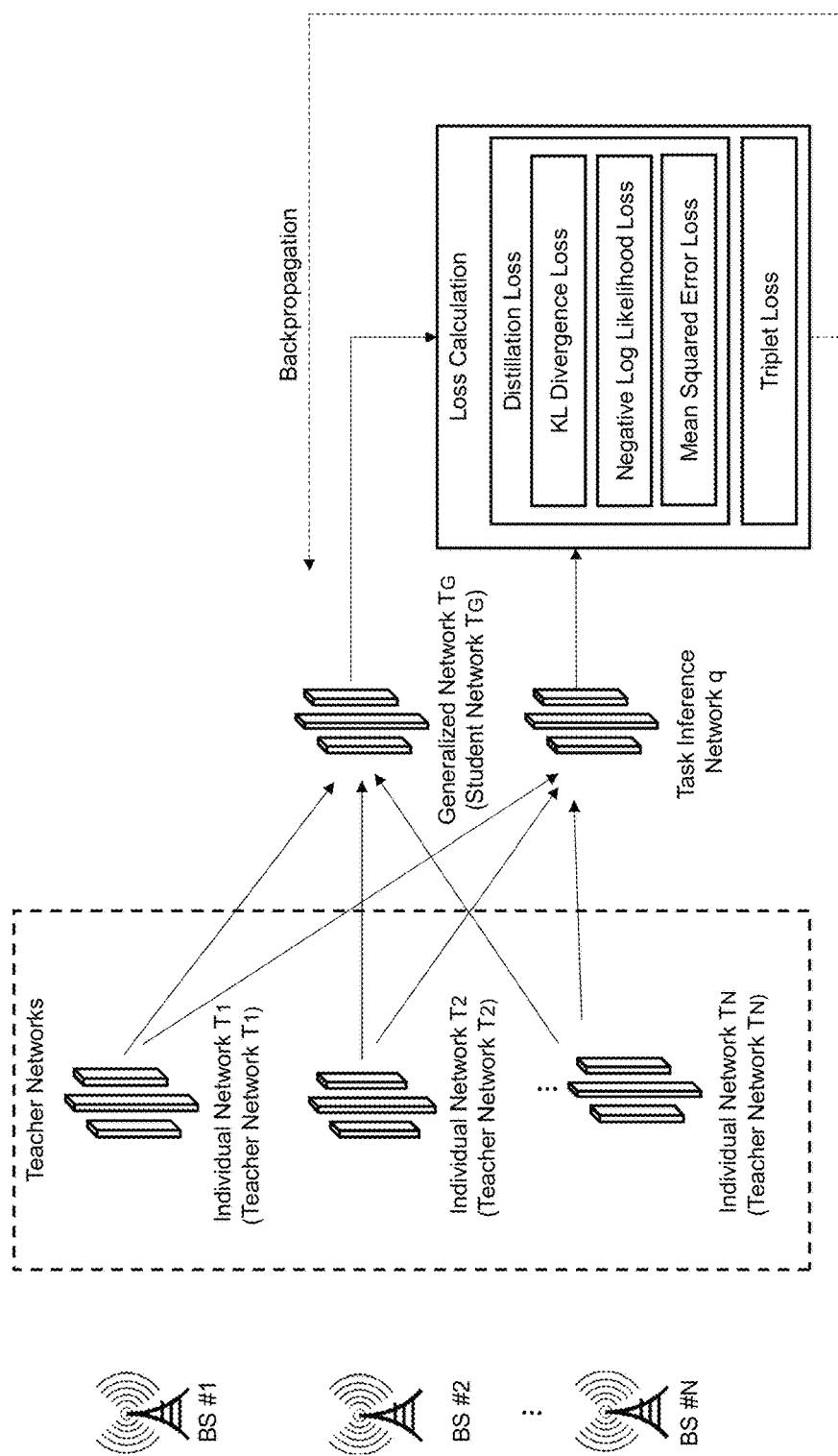
FIG. 5 illustrates a method for obtaining a generalized policy network according to embodiments of the present disclosure.

FIG. 5 illustrates a method for obtaining a generalized policy network according to embodiments.

Referring to FIG. 5, a generalized policy network $T_G$ may be trained using knowledge distilled from individual policy networks $T_1$-$T_N$ and also using a task inference network q which is implemented as a q-function network. The task inference network q may be a pre-trained policy network configured to takes a state, an action, and a reward as inputs, and output a task identity. Since multiple tasks are given based on a plurality of traffic data sets collected from different base stations, the task inference network q identifies the same tasks and different tasks among the multiple tasks.

The system may compute a distillation loss and a triplet loss, and combine the distillation loss and the triplet loss as an overall loss of the generalized policy network $T_G$. As the distillation loss, a Kullback-Leibler (KL) divergence loss, a negative log likelihood loss, or a mean squared error loss may be computed, which will be described later in detail with reference to Equations (10)-(12).

In multi-task RL, the system may be faced with a set of similar tasks, and it may be desirable to learn a policy that is able to leverage knowledge from all tasks and obtain a policy that has similar or better performance across all tasks. Policy distillation is one multi-task RL approach, where the distillation agent aggregates knowledge from all of the policies and distills them into one consistent policy. This distillation process leverages knowledge from all tasks and thus may potentially further improve policy performance.

Given a set of policies $\Pi=\{\pi_i|i=[1, 2, \ldots, N]\}$ and corresponding tasks $T_1, \ldots, T_N$, the system may learn a policy $\pi:S \to A$ such that Equation (6) is minimized:

$$\sum_{i=1}^{N}\sum_{s \in B} id(\pi(s), \pi_i(s)) \quad (6)$$

where d is a distance measure, and is chosen to be L2 distance. In addition, to help the task identification, the system may incorporate the task inference network q: $S \times A \times R \times S \to R_k$. The distilled policy and the task inference network q may be all parameterized by a neural network. The context tuple may be denoted as c=(s,a, R,s'), and the system may aim to minimize the loss function in Equation (7).

$$\mathcal{L}_\pi = \frac{1}{N}\sum_{i=1}^{N} \mathbb{E}_{s,c_i \sim \beta_i}[(\pi_i(s) - \pi(s, z_i))^2 + \beta KL(qc_i)||\mathcal{N}(0, 1))], z_i \sim q(c_i) \quad (7)$$

The system may introduce a relabeling process. Given a context tuple $c_i=(s_i, a_i, R_i, s'_i)$ from batch $B_i$ and a reward estimation of task $j$, $\hat{r}_j S \times A \to R$, the relabelling of $c_i$ to a new task j, denoted by $c_i^j$, is defined as: $c_i^j=(s_i, a_i, \hat{r}_j(s_i, a_i), s_i)$, the triplet loss function is defined as in Equation (8):

$$\mathcal{L}^{triplet} = \frac{1}{N(N-1)}\sum_{i=1}^{N}\sum_{j=1,j\neq i}^{N}[d(q(c_i^j), q(c_i)) - d(q(c_i^j), q(c_j)) + a]_+ \quad (8)$$

where a is the triplet margin, $[.]_+$ is the rectified linear unit (ReLU) function, q denotes a task interference network which outputs the posterior over task identity, and d is a divergence measure which is chosen to be the Kullback-Leibler (KL) divergence. The task interference network may takes a tuple as input and output a real value as follows: q: $S \times A \times R \times S \to R^k$. In equation (8), $q(c_i^j)$ and $q(c_i)$ represent task identifies with inputs of $c_i^j$ and $c_i$. $d(q(c_i^j), q(c_i))$ represents a distance between the same tasks (i.e., task i and task i), and $d(q(c_i^j), q(c_j))$ represents a distance between different tasks (i.e., task i and task j). By minimizing Equation (8), the system may encourage q to infer similar task representations when given either $c_i$ or $c_i^j$. Moreover, minimizing Equation (8) helps enforce q to infer different task identities for $c_j^i$ and $c_i$, which forces q to account for the reward information $c_i^j=(s_i, a_i, \hat{r}_j(s_i, a_i), s_i)$ instead of only relying on the state-action pairs. The triplet loss function enables the distance between the same tasks to be minimized, and at the same time, enables the distance between the different tasks to be maximized using the components of $d(q(c_i^j), q(c_i))$–$d(q(c_i^j), q(c_j))$ in Equation (8).

Adding with the previous distillation loss, the overall multi-batch policy loss may be computed as in Equation (9).

$$\mathcal{L} = \mathcal{L}^{triplet} + \mathcal{L}_\pi \quad (9)$$

By minimizing the loss function of Equation (9), the system may be able to obtain the final distilled policy $\pi$, as well as the task inference network q. The pseudo-code of multi-batch best action imitation learning is summarized in Algorithm 2.

---

[Algorithm 2]
Algorithm 2 MBAIL: Best Action Imitation Learning for Multiple Batches Input: Batches $B_1, \ldots, B_N$ of N tasks, maximum number of epochs E
1:  for t = 1, ..., N do
2:     Following Algorithm 1, train policy $\pi_t$.
3:  end for
4:  for i = 1, ..., E do
5:     Compute the distillation loss $\mathcal{L}_\pi$ via Equation 6
6:     Compute the triplet loss $\mathcal{L}^{triplet}$ via Equation 7.
7:     Do gradient descent w.r.t. $\pi$ and q for the loss function: $\mathcal{L} = \mathcal{L}^{triplet} + \mathcal{L}_\pi$
8:  end for
Output: The distilled policy $\pi$ and the task inference module q.

---

In some embodiments, there are two mainstages in multi-batch best action imitation learning. In the first stage (lines 1-3 of Table 2), the process disclosed herein is used to train policies for each task or each group of tasks with identical properties for the process disclosed herein. In the second stage (lines 4-8 of Table 2), the policies learned from each of the individual policies are distilled into one single multitask policy.

Referring to FIG. 5, the distillation loss is computed using a KL divergence loss function, a negative log likelihood loss function, or a mean-squared loss function.

In some embodiments, a negative log likelihood loss function may be used, which is a loss function for measuring how a new student policy can perform (e.g., the lower the better), as in Equation (10):

$$-\sum_{i=1}^{|D|} \log P(a_i = a_{i,best} \mid x_i, \theta_S) \quad (10)$$

where P is the student model parameters.

In some embodiments, a mean-squared loss may be used, which is a loss function to measure the distance for the outputs of the actions determined by the student policy and the actions determined by the teacher policy, as in Equation (11), which shows a squared loss between the student policy and the teacher policy.

$$\sum_{i=1}^{|D|} \|q_i^T - q_i^S\|_2^2 \quad (11)$$

In some embodiments, a KL divergence may be used, which measures the distribution distance for the actions determined by the student policy and the actions determined by the teacher policy, as in Equation (12):

$$\sum_{i=1}^{|D|} softmax\left(\frac{q_i^T}{\tau}\right) \ln \frac{softmax\left(\frac{q_i^T}{\tau}\right)}{softmax(q_i^S)} \quad (12)$$

where T represents a temperature parameter.

According to the example embodiments described below, and referring to Equations (10), (11), and (12), $q_i$ may represent the vector of unnormalized Q-values with one value per action, x may refer to the state and action respectively, $\theta_i$ may represent the parameters of the value/policy network, and D may represent the data set.

The system may implement the negative log likelihood loss to predict the same action as the highest valued action from the teacher (i.e., where $a_{i,best}$=argmax($q_i$) Equation (13)).

In determining the loss function to utilize, the system may determine which types of reinforcement learning algorithms are to be used. When the system uses policy-based reinforcement learning methods (e.g., policy gradients) and the outputs are continuous values, the system may use the KL divergence loss, as in Equation (12). When the system uses value-based reinforcement learning methods (e.g., Q-learning), and the outputs are discrete values, the system may use the negative log-likelihood loss of Equation (10) and/or the mean squared error loss of Equation (11).

Figure 6:
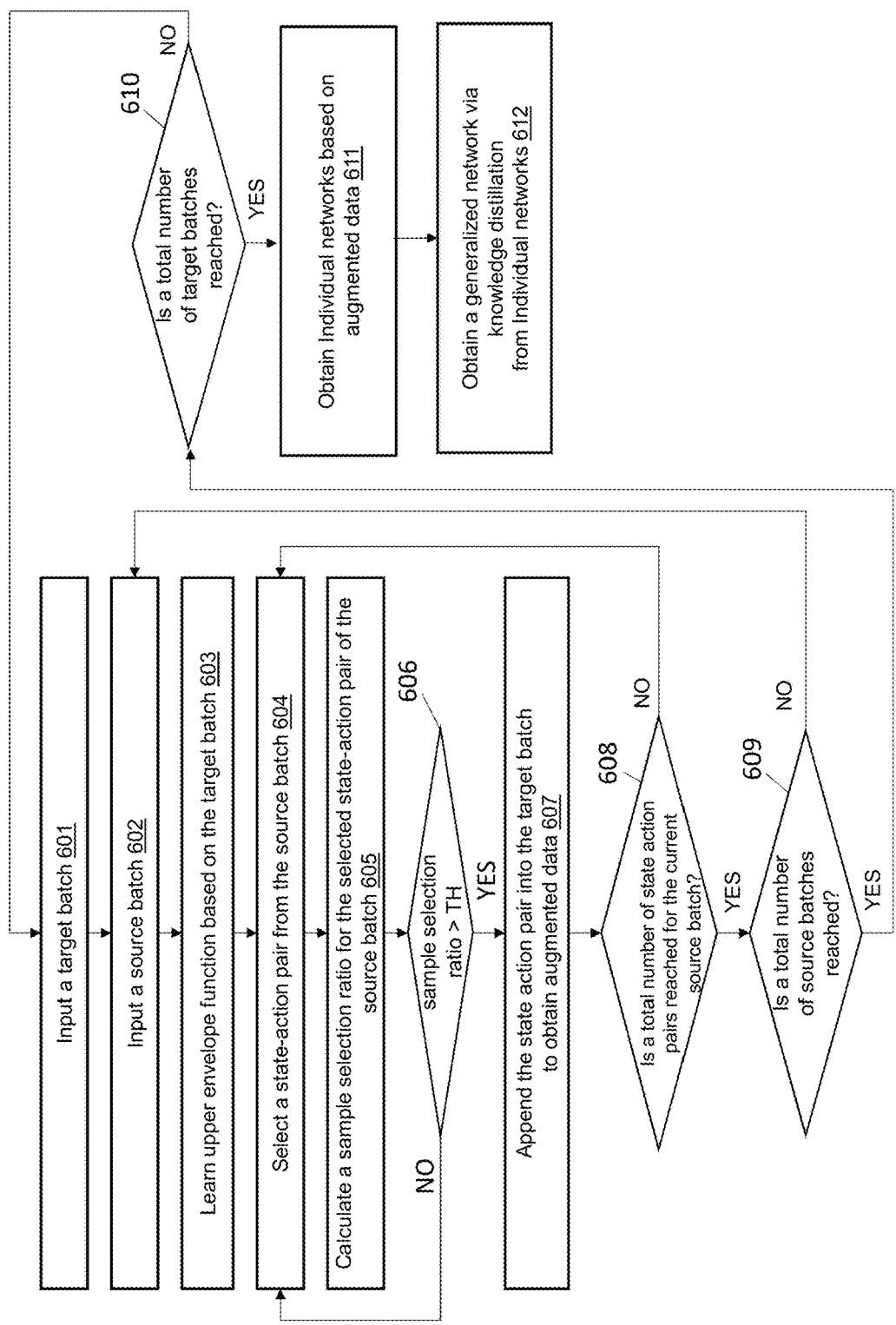
FIG. 6 is a flowchart illustrating a method for predicting a future traffic load in a communication system according to embodiments of the present disclosure.

FIG. 6 is a flowchart illustrating a method for predicting a future traffic load in a communication system according to embodiments of the present disclosure;

In operations 601 and 602, the system may input a target task batch and a source task batch. The system may treat the current task batch as the target task batch, and use the remaining (N−1) data sets as the source task batches. The system may loop over all source batches to select state-action pairs of the source batches and to append the selected state-action pairs to the target task batch.

In operation 603, the system may learn an upper envelope function based on the target batch, for the current source batch. For example, the system may learn the upper envelope function using Equation (3).

In operation 604, the system may select a state-action pair from the source task batch for calculation of a sample selection ratio of the selected state-action pair. The system may select each of a plurality of state-action pairs from the source task to calculate a sample selection ratio of each of the plurality of state-action pairs.

In operation 605, the system may compute the sample selection ratio of the selected state-action pair, based on the upper envelope function of the target batch.

In operation 606, the system may determine whether the sample selection ratio of the state action pair is greater than a predetermined sample selection ratio TH. If the sample selection ratio of the state action pair is not greater than the predetermined sample selection ratio TH, the system may return to operation 604 to select another state-action pair from the source task batch. If the selected state action pair is greater than the predetermined sample selection ratio TH, in operation 606, the system may append the selected state-action pair into the target task batch so that the target task batch has an augmented data set in operation 607.

In operation 608, the system may determine whether a total number of state-action pairs is reached for the current source task batch. If the total number of state-action pairs is reached for the current source task batch (i.e., operations 604-607 are performed for all the state-action pairs in the current source task batch), the system proceeds to operation 609 to determine whether the number of source task batches has been reached (e.g., whether operations 603-607 are performed for all the source task batches).

If, in operation 609, the system determines that the total source batch number is reached, the system may proceed to operation 610. Otherwise, the system proceeds to operation 602 to select another source task batch to perform operations 603-608 until operations 603-608 all the source task batches.

In operation 610, the system determines whether a total number of target batches has been reached, to check whether data augmentation is performed for all the target batches. For example, when there are five (5) task batches D1-D5, D1 is input as a target task batch and D2-D5 are used as source task batches at the first iteration of operations 601-609. At the second iteration of operations 601-609, D2 is input as the target task batch, and D1 and D2-D5 are used as the source task batches. At the third iteration of operations 601-609, D3 is input as the target task batch, and D1, D2, D4, and D5 are used as the source task batches. At the fourth iteration of operations 601-609, D4 is input as the target task batch, and D1-D3 and D5 are used as the source task batches. At the fifth iteration of operations 601-609, D5 is input as the target task batch, and D1-D4 are used as the source task batches.

In operation 611, the system may obtain individual policy networks based on augmentation data via imitation learning. Operation 611 may correspond to operation 240 described with reference to FIG. 4.

In operation 612, the system may obtain a generalized policy network via knowledge distillation from the individual policy networks, using a task interference network. Operation 612 may correspond to operation 250. The generalized policy network may be referred to as a final control policy.

For example, when two individual policy networks are generated, the system may receive, as inputs, two data sets $B_1$ and $B_2$, as well as two control policies $\pi_1$ and $\pi_2$ from the two individual policy networks. The system may generate a dataset including state action reward transition pairs based on the two control policies. The state-action-reward transition pairs include system states (e.g., active UE number, IP throughput, cell physical resource usage, etc.) and defined rewards (e.g., the minimum of IP throughput of all frequencies, etc.) that are to be received as a result of taking an action in the current system state. The system may train a student network by minimizing a policy distillation loss function to obtain the generalized policy network as the trained student network. The generalized policy network may output a similar action close to the two control policies. The policy distillation loss function may be computed as in Equation (14):

$$\Sigma_{i=1}^{N} \Sigma_{S \in B_i} KL(\pi_{final}(s), \pi_i(s)) \tag{14}$$

When the policy distillation loss becomes less than a predetermined threshold value or does not reduce any longer (i.e., the policy distillation loss has a constant value with a preset margin), the system may stop the training process of the student network and use the trained student network as the generalized policy network.

Figure 7:
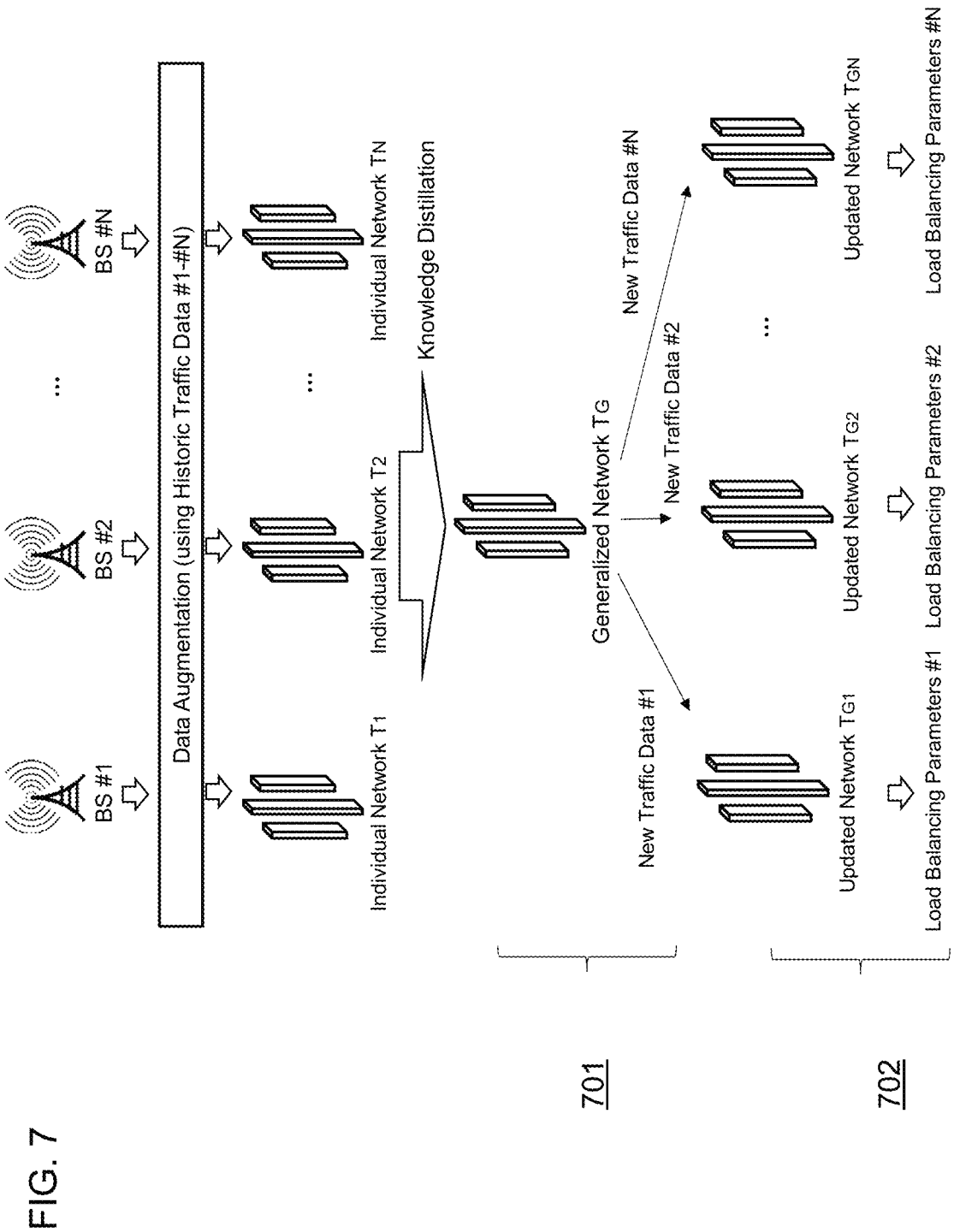
FIG. 7 illustrate a system for obtaining updated networks from a generalized policy network according to embodiments of the present disclosure.

FIG. 7 illustrates a system for obtaining updated networks from a generalized policy network according to embodiments. A fine-tuning method may be applied to the generalized policy network based on traffic data that are collected from each of a plurality of base stations.

In operation 701, the system may receive, as an input, a newly acquired dataset, New Traffic Data #1-New Traffic Data #N, in the field from base stations BS #1-BS #N, and a generalized policy network $T_G$ which provides a final control policy.

In operation 702, the system may update the generalized policy network $T_G$ based on the newly acquired dataset, New Traffic Data #1-New Traffic Data #N, respectively, to obtain updated networks $T_{G1}$-$T_{GN}$ which provide updated final control policies for the base stations BS #1-BS #N, respectively.

The generalized policy network $T_G$ and the updated networks $T_{G1}$-$T_{GN}$ may be applied to communication load balancing. Mobile traffic has been increasing quickly in recent years due to the fast increase for both the number of mobile devices and the data demand per device. Specifically, example embodiments address the problem of load balancing for idle mode users, referred to as idle mode user equipment (UE)-based load balancing (IULB). The IULB is implemented by adjusting the preferred cell (i.e., a combination of a serving sector and wireless frequency) to which the UE is camped on. Implementing load balancing for idle users may help balance the load between different frequencies while avoiding potential packet loss. In communications systems, eNodeB/gNodeB communicate the dedicated re-selection priorities to multiple UEs. This cell re-selection preference is given by $w_i$, where i refers to the i'th cell/frequency. By changing the cell re-selection priorities, the re-camping cell can be changed. Example embodiments of this disclosure learn a control policy while using the pre-collected lagged data with MBAIL.

The IULB problem may be treated as a sequential decision making problem as modeled as an MDP as follows:

(1) S is the state space. The system may consider the radio-resource connected active UEs per cell, the IP throughput per cell, and the cell physical resource block (PRB) usage per cell;
(2) A is the action space corresponding to re-selection parameters for cell; and
r:S×A×S→R is the reward function, which is chosen as the minimal time-averaged IP throughput over the cells.

The collected data from multiple base stations may be used to learn or to improve the load balancing control policy. The system may assume that there are M base stations and that there are M set of batches $D_1, \ldots, D_M$ collected from these base stations. The system may assume that each dataset $D_M$ is composed of K samples following the above MDP formulation. An overall example of using multi-batch best action imitation learning for communication load balancing is shown in FIGS. 1-7.

Figure 8:
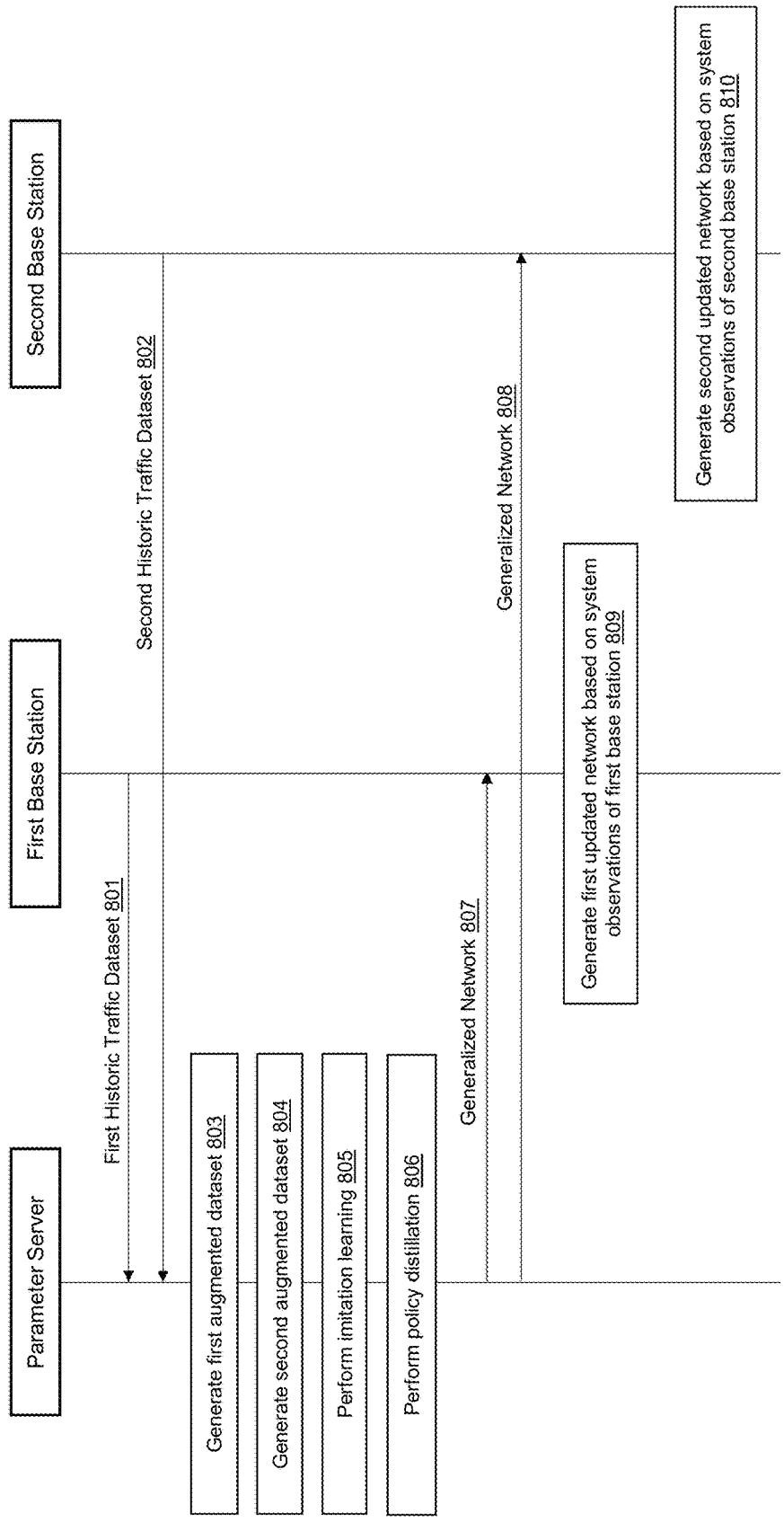
FIG. 8 is a flowchart of a method of load balancing in a system according to embodiments of the present disclosure.

FIG. 8 is a flowchart of a method of load balancing in a system according to an embodiment. The system may include a parameter server, a first base station and a second base station.

In operation 801, the parameter server may receive a first historical dataset from the first base station. In operation 802, the parameter server may receive a second historical dataset from the second base station. Operations 801 and 802 may correspond to operations 210 and 220 illustrated in FIG. 2.

In operation 803, the parameter server may generate a first augmented dataset that includes the (entire) first historical dataset and a subset of the second historical traffic data. The subset of the second historical traffic data may be selected based on a sample selection ratio of the subset of the second historical traffic data being greater than a predetermined sample selection threshold. In operation 804, the parameter server may generate a second augmented dataset that includes the (entire) second historical dataset, and a subsect of the first historical dataset. The subset of the first historical traffic data may be selected based on a sample selection ratio of the subset of the first historical traffic data being greater than the predetermined sample selection threshold. Operations 803 and 804 may correspond to operation 230 illustrated in FIG. 2.

In operation 805, the parameter server may perform imitation learning based on the first augmented dataset and the second augmented dataset to generate a first individual policy network and a second individual policy network for the first base station and the second base station. Operation 805 may correspond to operation 240.

In operation 806, the parameter server may obtain a generalized policy network that provides a traffic load balancing policy, based on guided policy distillation from the first individual policy network and the second individual policy network. Operation 806 may correspond to operation 250.

In operations 807 and 808, the parameter server may send the generalized policy network and/or load balancing parameters output from the generalized policy network to the first base station and the second base station.

In operation 809 and 810, the first base station and the second base station may perform load balancing based on the load balancing parameters received from the parameter server, or may update the generalized policy network to a first updated network and a second updated network based on system observations (e.g., IP throughput, download link, cell physical resource usage, etc.) of the first base station and the second base station, respectively. The first base station and the second base station may include a system state monitor to observe a traffic state of the first base station and the second base station. When the generalized policy network is updated based on local traffic data, the first base station and the second base station may perform load balancing using load balancing parameters output from the first updated network and the second updated network, respectively. Operations 809 and 810 may correspond to fine-tuning operation 702 illustrated in FIG. 7.

Figure 9:
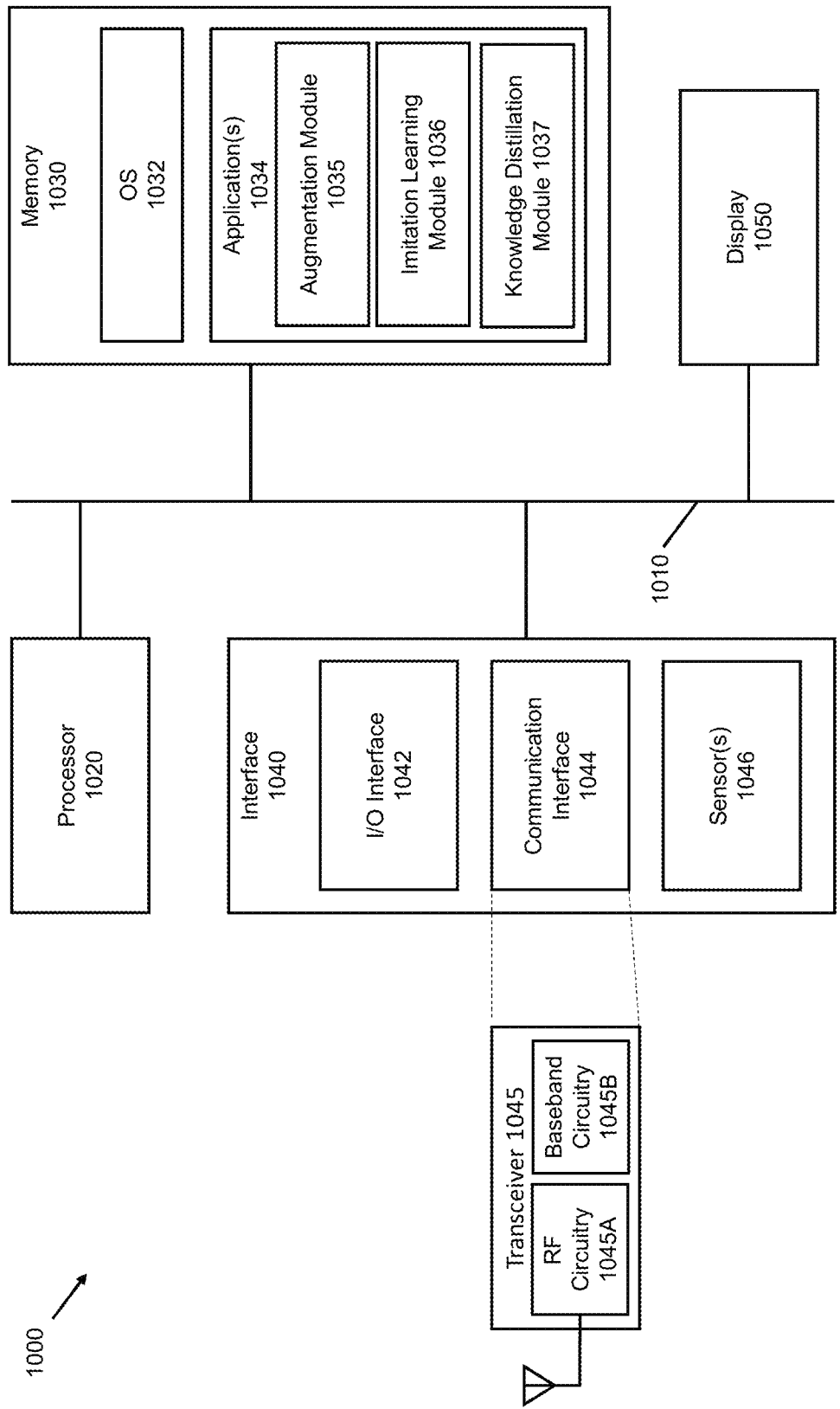
FIG. 9 is a block diagram of an electronic device according to embodiments of the present disclosure.

FIG. 9 is a block diagram of an electronic device 1000 according to embodiments.

FIG. 9 is for illustration only, and other embodiments of the electronic device 1000 could be used without departing from the scope of this disclosure. For example, the electronic device 1000 may correspond to the parameter server illustrated in FIG. 8.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 performs operations 210-250 illustrated in FIG. 2, and operations 601-612 in FIG. 6. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

In particular, the memory 1030 stores data, computer-readable instructions, applications, and setting information for the operation of base stations of the communication system 111. The memory 1030 may store traffic data, augmented traffic data, individual policy networks, a generalized policy network, a task inference network., information on a bearer allocated to an accessed UE and a measurement result reported from the accessed UE.

The applications 1034 include the above-discussed embodiments. These functions can be performed by a single application or by multiple applications that each carry out one or more of these functions. For example, the applications 1034 may include artificial intelligence (AI) models for performing operations 210-250 illustrated in FIG. 2, and operations 601-612 in FIG. 6.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The communication interface 1044 may include a transceiver 1045 to enable communication between the electronic device 1000 and other external devices (e.g., a target base station, a plurality of source base stations, and other servers that store teacher networks), via a wired connection, a wireless connection, or a combination of wired and wireless connections. The communication interface 1044 may permit the electronic device 1000 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like.

The transceiver 1045 of the communication interface 1044 may include a radio frequency (RF) circuitry 1045A and a baseband circuitry 1045B.

The baseband circuitry 1045B may transmit and receive a signal through a wireless channel, and may perform band conversion and amplification on the signal. The RF circuitry 1045A may up-convert a baseband signal provided from the baseband circuitry 1045B into an RF band signal and then transmits the converted signal through an antenna, and down-converts an RF band signal received through the antenna into a baseband signal. For example, the RF circuitry 1045A may include a transmission filter, a reception filter, an amplifier, a mixer, an oscillator, a digital-to-analog converter (DAC), and an analog-to-digital converter (ADC).

The transceiver 1045 may be connected to one or more antennas. The RF circuitry 1045A of the transceiver 1045 may include a plurality of RF chains and may perform beamforming. For the beamforming, the RF circuitry 1045A may control a phase and a size of each of the signals transmitted and received through a plurality of antennas or antenna elements. The RF circuitry 1045A may perform a downlink multi-input and multi-output (MIMO) operation by transmitting one or more layers.

The baseband circuitry 1045A may perform conversion between a baseband signal and a bitstream according to a physical layer standard of the radio access technology. For example, when data is transmitted, the baseband circuitry 1045B generates complex symbols by encoding and modulating a transmission bitstream. When data is received, the baseband circuitry 1045B reconstructs a reception bitstream by demodulating and decoding a baseband signal provided from the RF circuitry 1045A.

The sensor(s) 1046 of the interface 1040 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, and one or more buttons for touch input. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000.

Referring back to the processor 1020, the processor 1020 may transmit and receive signals through the RF circuitry 1045A and the baseband circuitry 1045B. The processor 1020 may record data (e.g., target traffic data, source traffic data, and teacher networks) in the memory 1030 and read the data from the memory 1030.

For example, when the electronic device 1000 corresponds to the parameter server, the processor 1020 may receive from the communication system 111, traffic data, such as information about a number of active UEs that are served by each cell of the base stations, a cell load ratio, and an internet protocol (IP) throughput per cell, and may store the information of the number of active UEs, the cell load ratio, and the PI throughput per cell, in the memory 1020. The processor 1020 may control the transceiver 1045 to transmit a request for traffic data to the communication system 111, and to receive from the server 120 the information of the number of active UEs, the cell load ratio, and the IP throughput per cell, in response to the request from the traffic data. The processor 1020 may perform operations 210-250 and operations 601-612 based on the communication system state information, and may transmit a forecasted communication traffic load of a target base station (e.g., a target base station $BS_T$ illustrated in FIG. 1) or a forecasted communication traffic load of each of a plurality of cells of the target base station to the communication system 111. The communication system 111 may allocate communication bandwidth or UEs to the plurality of base stations of the communication system 111 or to the plurality of cells of the target base station, according to the forecasted communication traffic load, so that traffic loads are distributed relatively evenly among the plurality of base stations, and/or among the plurality of cells of the target base station.

Figure 10:
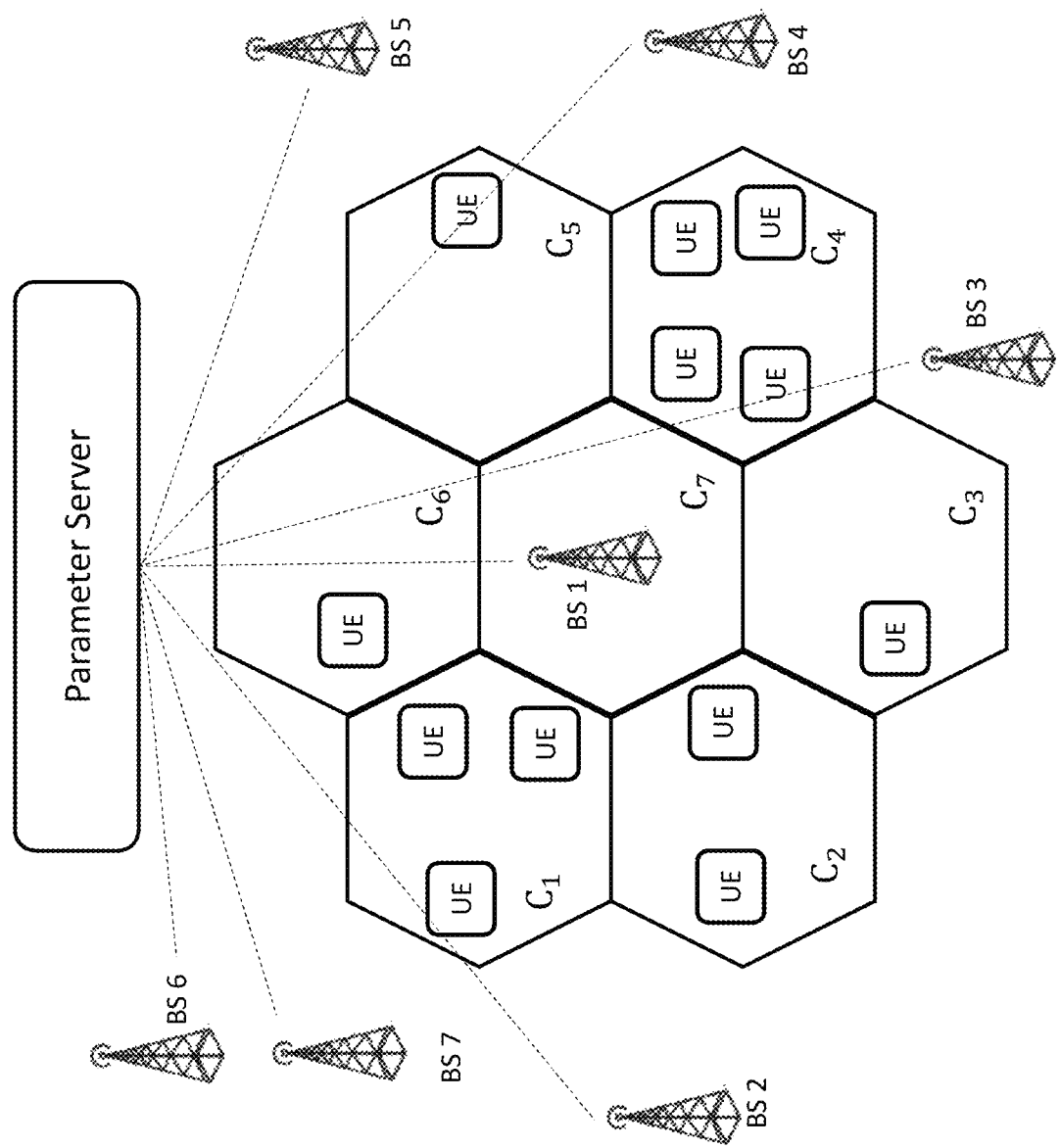
FIG. 10 illustrates a use application in which a server performs traffic load balancing between different communication cells, according to embodiments of the present disclosure.

FIG. 10 illustrates a use application in which a server performs traffic load balancing between different communication cells, according to embodiments.

Referring to FIG. 10, a system for performing traffic load balancing according to an example embodiment includes a parameter server, a plurality of base stations BS1-BS7 each of which serves a plurality of cells having different cell reselection priorities, and a plurality of UEs that are respectively served in the plurality of cells. Among the plurality of base stations BS1-BS7, BS1 is the target base station, and the rest of base stations BS2-BS7 are source base stations.

In an example embodiment, the target base station BS1 may serve a plurality of cells $C_1$-$C_7$ having different frequency bands $f_1$-$f_7$ and different cell reselection priorities.

The parameter server may communicate with the plurality of base stations BS1-BS7 to receive information about the state of the UEs in their serving cells, for example, whether the UEs are in an idle mode or an active mode, the number of active UEs, and an internet protocol (IP) throughput of each cell.

The parameter server may determine a cell reselection priority for each of the plurality of cells $C_1$-$C_7$ of the target base station BS1 based on a forecasted communication traffic load of the target base station BS1 that is predicted via operations 401-412. The communication traffic load may be predicted using communication system state information received from the plurality of base stations BS1-BS7. The parameter server may transmit the cell reselection priorities to the target base station BS1. The target base station BS1 may forward the cell reselection priorities to the plurality of UEs so that some of the plurality of UEs are reassigned to another cell to distribute traffic load among the plurality of cells C1-C7.

Figure 11:
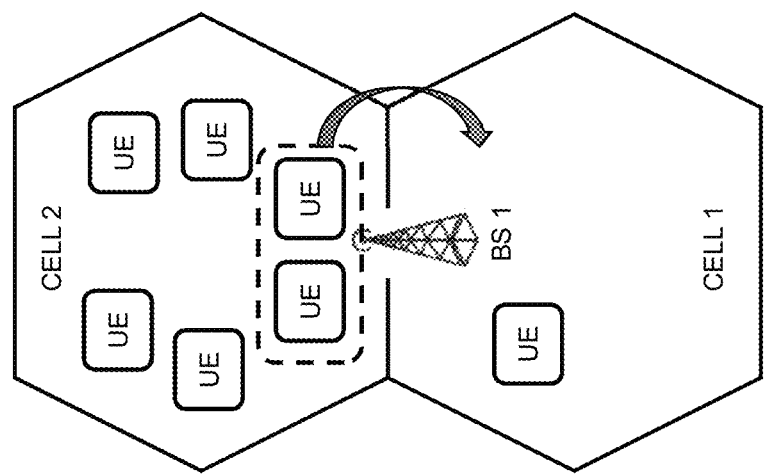
FIG. 11 illustrates a cell reselection process according to embodiments of the present disclosure.

FIG. 11 illustrates a cell reselection process according to an example embodiment.

As shown in FIG. 11, a communication system includes at least one base station (BS), a communication network, and a plurality of user equipment (UEs) that access the communication network through the at least one BS.

The at least one BS may correspond to an Evolved Node B (eNB), a 5G Node (gNB), a 6G Node. The BS may collect status information of the UEs and may provide the UEs with access to the communication network based on the status information. Examples of the status information may include information of whether the UEs are in an active mode or an idle mode, and may also include a buffer status, an available transmission power status, and a channel status of each of the UEs.

The communication system provides a first cell Cell 1 and a second cell Cell 2, that are served by a target base station BS1. For example, when six (6) UEs are connected to Cell 1 and one (1) cell is connected to Cell 2, one or more UEs among the six UEs in Cell 2 are reassigned to Cell 1 to distribute communication traffic load between Cell 1 and Cell 2.

Specifically, in an LTE, a 5G system, or a 6G system, the target base station BS1 may determine a cell reselection priority for each cell Cell 1 and Cell 2 to which the UEs should connect, through a radio resource control releasing message. The UEs may determine a target call on which to camp based on the cell reselection priority. For each UE, the cell reselection process is performed as a probabilistic process based on the cell reselection priority. When Cell 1 has a high cell reselection priority, a given idle mode UE may have a high probability of being reselected to camp on Cell 1. The communication system may shift idle UEs from overloaded Cell 2 to less loaded Cell 1.

Figure 12:
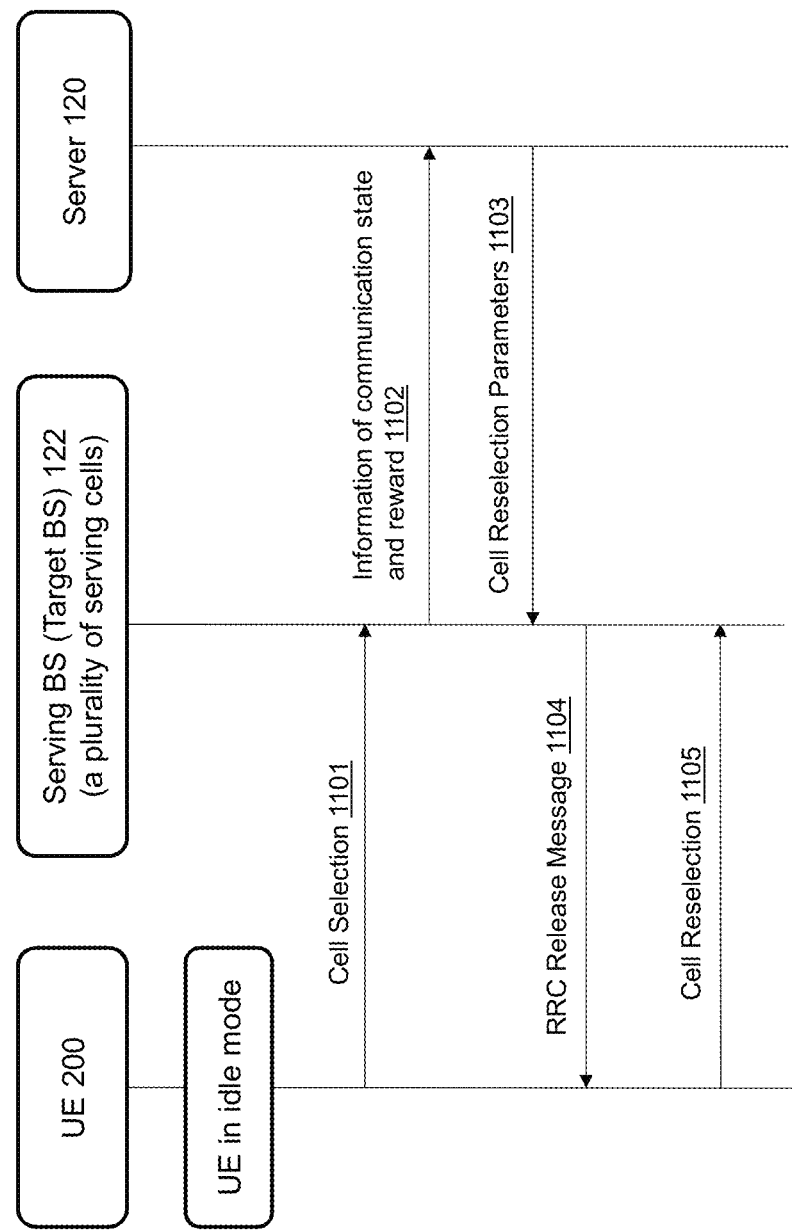
FIG. 12 illustrates a method of communicating with a user equipment and a base station to perform a cell reselection process according to embodiments of the present disclosure.

FIG. 12 illustrates a method of communicating with a user equipment (UE) and a base station (BS) to perform a cell reselection process according to an example embodiment.

As shown in FIG. 12, the UE 200 in an idle mode may perform an initial cell selection in operation 1101. In order to select an initial cell, the UE 200 may scan all radio frequency (RF) channels in its operating frequency bands and may select an initial cell for the UE to camp on, based on cell selection criterion. For example, the UE 200 may select the initial cell based on various parameters, such as for example, a cell selection reception (RX) level value (Srxlev), a cell selection quality value (Squal), an offset temporarily applied to a cell (Qoffsettemp), a measured cell reception level value (Qqualmeas), a measured cell quality value (Qrxlevmeas), a minimum required RX level in the cell (Qrxlevmin), a minimum required quality level in the cell (Qqualmin). The UE 200 transmits information of the selected initial cell to a base station 122 that manages a plurality of cells, so that the UE 200 in the idle mode camps on the selected initial cell among the plurality of cells.

In operation 1102, the base station 122 may transmit traffic data, including the number of active mode UEs per cell, the cell load ratio, and the IP throughput per cell, to the server 120.

In operation 1103, the server 120 may determine cell reselection parameters based on a traffic load that is predicted by operations 210-250 and/or operations 601-612, and may transmit the cell reselection parameters to the base station 122. The cell reselection parameters may correspond to cell reselection priorities that are assigned to the plurality of cells $C_1$-$C_7$ shown in FIG. 9.

In operation 1104, the base station 122 may transmit a Radio Resource Control (RRC) Release message including the cell reselection parameters, to the UE 200.

In operation 1105, the UE 200 then may select a target cell to camp on based on the cell reselection parameters, and may send information of the selected target cell to the base station 122. For example, when a second cell $C_2$ has a higher cell reselection priority than the other neighboring cells, $C_1$ and $C_3$-$C_7$, among the plurality of cells $C_1$-$C_7$, the idle mode UE 200 has a higher probability of being re-assigned to camp on the second cell $C_2$ than other neighboring cells, $C_1$ and $C_3$-$C_7$.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings including FIG. 9, may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing traffic load balancing in a communication system, the method comprising:
   receiving a first traffic data from a first base station;
   receiving a second traffic data from a second base station;
   obtaining a first augmented traffic data for the first base station, based on the first traffic data and a subset data of the second traffic data that is selected based on similarity between the first traffic data and the second traffic data;
   obtaining a second augmented traffic data for the second base station, based on the second traffic data and a subset data of the first traffic data that is selected based on the similarity between the first traffic data and the second traffic data;
   obtaining a first artificial intelligence (AI) model based on the first augmented traffic data;
   obtaining a second AI model based on the second augmented traffic data;
   obtaining a generalized AI model via knowledge distillation from the first AI model and the second AI model; and
   predicting a traffic load of each of the first base station and the second base station based on the generalized AI model.

2. The method of claim 1, wherein the obtaining the first augmented traffic data comprises:
   obtaining an upper envelope function based on the first traffic data;
   obtaining a sample selection ratio for a state-action pair of the second traffic data based on the upper envelope function; and
   based on the sample selection ratio for the state-action pair of the second traffic data being greater than a predetermined sample selection ratio threshold, appending the state-action pair of the second traffic data to the first augmented traffic data.

3. The method of claim 2, wherein the sample selection ratio represents a similarity between state-action pairs of the first traffic data and the state-action pair of the second traffic data.

4. The method of claim 2, wherein the state-action pair comprises a state of the communication system, and a reward to be received as a result of taking an action at the state, and
   wherein the state comprises at least one of an active user equipment (UE) number, an internet protocol (IP) throughput, a cell physical resource usage, and a speed of a download link, the action comprises a load balancing parameter that causes the state to be changed, and the reward comprises a minimum of IP throughput.

5. The method of claim 2, wherein the obtaining the sample selection ratio comprises:
   obtaining an estimated return of the state-action pair of the second traffic data; and
   obtaining the sample selection ratio by dividing the estimated return of the state-action pair of the second traffic data by the upper envelope function.

6. The method of claim 1, wherein the first AI model and the second AI model are obtained via imitation learning, and
   wherein the obtaining the generalized AI model comprises:
   computing a distillation loss between actions output from the first AI model and the second AI model and actions output from the generalized AI model, and
   training the generalized AI model based on the distillation loss.

7. The method of claim 6, wherein the obtaining the generalized AI model comprises:
   computing a triplet loss based on a difference between identical tasks and a difference between different tasks, wherein the identical tasks are to predict the traffic load for a same base station, and the different tasks are to predict the traffic load for each of different base stations, and an identity of each of the identical tasks and the different tasks is provided by a task interference AI model;

combining the distillation loss and the triplet loss as an overall loss of the generalized AI model; and training the generalized AI model until the overall loss converges or reaches a preset threshold value.

8. The method of claim 1, further comprising:

transmitting the generalized AI model to the first base station to update the generalized AI model as a first updated AI model based on a system observation of the first base station; and transmitting the generalized AI model to the second base station to update the generalized AI model as a second updated AI model based on a system observation of the second base station.

9. The method of claim 1, wherein each of the first traffic data and the second traffic data comprises information of at least one of a number of active user equipment (UEs) per cell, a cell load ratio, and an internet protocol (IP) throughput per cell.

10. A server for performing traffic load balancing in a communication system, the server comprising:

a memory storing instructions, and at least one processor configured to execute the instructions to:

receive a first traffic data from a first base station;

receive a second traffic data from a second base station;

obtain a first augmented traffic data for the first base station, based on the first traffic data and a subset data of the second traffic data that is selected based on similarity between the first traffic data and the second traffic data;

obtain a second augmented traffic data for the second base station, based on the second traffic data and a subset data of the first traffic data that is selected based on the similarity between the first traffic data and the second traffic data;

obtain a first artificial intelligence (AI) model based on the first augmented traffic data;

obtain a second AI model based on the second augmented traffic data;

obtain a generalized AI model via knowledge distillation from the first AI model and the second AI model; and predict a traffic load of each of the first base station and the second base station based on the generalized AI model.

11. The server of claim 10, wherein the at least one processor is further configured to execute the instructions to:

obtain an upper envelope function based on the first traffic data;

obtain a sample selection ratio for a state-action pair of the second traffic data based on the upper envelope function; and based on the sample selection ratio being greater than a predetermined sample selection ratio threshold, append the state-action pair of the second traffic data to the first augmented traffic data.

12. The server of claim 11, wherein the sample selection ratio represents a similarity between state-action pairs of the first traffic data and the state-action pair of the second traffic data.

13. The server of claim 11, wherein the state-action pair comprises a state of the communication system, and a reward to be received as a result of taking an action at the state, and wherein the state comprises at least one of an active user equipment (UE) number, an internet protocol (IP) throughput, and a cell physical resource usage, and a speed of a download link, the action comprises a load balancing parameter that causes the state to be changed, and the reward comprises a minimum of IP throughput.

14. The server of claim 11, wherein the at least one processor is further configured to execute the instructions to:

obtain an estimated return of the state-action pair of the second traffic data; and obtain the sample selection ratio by dividing the estimated return of the state-action pair of the second traffic data by the upper envelope function.

15. The server of claim 10, wherein the first AI model and the second AI model are obtained via imitation learning, and wherein the at least one processor is further configured to execute the instructions to:

compute a distillation loss between actions output from the first AI model and the second AI model and actions output from the generalized AI model, and train the generalized AI model based on the distillation loss.

16. The server of claim 15, wherein the at least one processor is further configured to execute the instructions to:

compute a triplet loss based on a difference between identical tasks and a difference between different tasks, wherein the identical tasks are to predict the traffic load for a same base station, and the different tasks are to predict the traffic load for each of different base stations, and an identity of each of the identical tasks and the different tasks is provided by a task interference AI model;

combine the distillation loss and the triplet loss as an overall loss of the generalized AI model; and train the generalized AI model until the overall loss converges or reaches a preset threshold value.

17. The server of claim 10, wherein the at least one processor is further configured to execute the instructions to:

transmit the generalized AI model to the first base station to update the generalized AI model as a first updated AI model based on a system observation of the first base station; and transmit the generalized AI model to the second base station to update the generalized AI model as a second updated AI model based on a system observation of the second base station.

18. The server of claim 10, wherein each of the first traffic data and the second traffic data comprises information of at least one of a number of active user equipment (UEs) per cell, a cell load ratio, and an internet protocol (IP) throughput per cell.

19. A non-transitory computer-readable storage medium storing instructions that, when executed, cause at least one processor to:

receive a first traffic data from a first base station;

receive a second traffic data from a second base station;

obtain a first augmented traffic data for the first base station, based on the first traffic data and a subset data of the second traffic data that is selected based on the similarity between the first traffic data and the second traffic data;

obtain a second augmented traffic data for the second base station, based on the second traffic data and a subset data of the first traffic data that is selected based on the similarity between the first traffic data and the second traffic data;

obtain a first artificial intelligence (AI) model based on the first augmented traffic data;

obtain a second AI model based on the second augmented traffic data;

obtain a generalized AI model via knowledge distillation from the first AI model and the second AI model; and predict a traffic load of each of the first base station and the second base station based on the generalized AI model.

20. The non-transitory computer-readable storage medium of claim 19, wherein the instructions causes the at least one processor to:

obtain a sample selection ratio for a state-action pair of the second traffic data based on a similarity between state-action pairs of the first traffic data and the state-action pair of the second traffic data; and based on the sample selection ratio being greater than a predetermined sample selection ratio threshold, append the state-action pair of the second traffic data to the first augmented traffic data.

* * * * *